(12) United States Patent
Ammi et al.

(10) Patent No.: US 10,807,301 B2
(45) Date of Patent: Oct. 20, 2020

(54) METHOD AND APPARATUS FOR MANUFACTURING A MECHATRONIC SYSTEM BY THREE-DIMENSIONAL PRINTING

(71) Applicants: CENTRE NATIONAL DE LA RECHERCHE SCIENTIFIQUE, Paris (FR); UNIVERSITE PARIS-SUD, Orsay (FR)

(72) Inventors: Mehdi Ammi, Massy (FR); Florian Longnos, Nieul sur Mer (FR)

(73) Assignees: CENTRE NATIONAL DE LA RECHERCHE SCIENTIFIQUE, Paris (FR); UNIVERSITE PARIS-SUD, Orsay (FR)

(*) Notice: Subject to any disclaimer, the term of this patent is extended or adjusted under 35 U.S.C. 154(b) by 14 days.

(21) Appl. No.: 16/307,132

(22) PCT Filed: Jun. 5, 2017

(86) PCT No.: PCT/EP2017/063606
§ 371 (c)(1),
(2) Date: Dec. 4, 2018

(87) PCT Pub. No.: WO2017/215971
PCT Pub. Date: Dec. 21, 2017

(65) Prior Publication Data
US 2019/0217529 A1 Jul. 18, 2019

(30) Foreign Application Priority Data

Jun. 15, 2016 (FR) .................................... 16 55552

(51) Int. Cl.
*B29C 64/112* (2017.01)
*B33Y 80/00* (2015.01)
(Continued)

(52) U.S. Cl.
CPC .......... *B29C 64/112* (2017.08); *B29C 64/118* (2017.08); *B29C 64/209* (2017.08);
(Continued)

(58) Field of Classification Search
CPC ..... B29C 64/112; B29C 64/209; B33Y 30/00; B33Y 10/00
See application file for complete search history.

(56) References Cited

U.S. PATENT DOCUMENTS

2010/0021580 A1 1/2010 Swanson et al.
2013/0142942 A1* 6/2013 Wang ....................... A61B 5/00
427/8

(Continued)

FOREIGN PATENT DOCUMENTS

WO 2014/209994 A2 12/2014
WO 2015/130401 A2 9/2015

OTHER PUBLICATIONS

Coiai, et al., "Nanocomposites Based on Thermoplastic Polymers and Functional Nanotiller for Sensor Applications", Materials, vol. 8, pp. 3377-3427, 2015.

(Continued)

*Primary Examiner* — Vincent H Tran
(74) *Attorney, Agent, or Firm* — BakerHostetler

(57) ABSTRACT

Method for manufacturing a mechatronic system comprising: a step of manufacturing a mechanical structure (SM) by three-dimensional printing by fused filament deposition of at least one first electrically insulating material (M1), and a step of manufacturing at least one electrical component (CE) in contact with at least one element of said mechanical structure and secured therewith; characterized in that said step of manufacturing at least one electrical component is implemented by three-dimensional printing by fused filament deposition of at least one second material (M2), (Continued)

conductive or resistive, directly in contact with said element of the mechanical structure. Apparatus for implementing such a method. Mechatronic system that can be manufactured by such a method.

15 Claims, 16 Drawing Sheets

(51) Int. Cl.
B33Y 10/00 (2015.01)
B33Y 30/00 (2015.01)
B29C 64/118 (2017.01)
B29C 64/209 (2017.01)
B29L 31/34 (2006.01)

(52) U.S. Cl.
CPC .............. B33Y 10/00 (2014.12); B33Y 30/00 (2014.12); B33Y 80/00 (2014.12); B29L 2031/3493 (2013.01)

(56) References Cited

U.S. PATENT DOCUMENTS

| | | | |
|---|---|---|---|
| 2013/0319118 A1* | 12/2013 | Deng | G01H 11/08 73/514.32 |
| 2014/0328964 A1 | 11/2014 | Mark et al. | |
| 2015/0079666 A1* | 3/2015 | Brahmasandra | B01L 7/52 435/287.2 |
| 2015/0173203 A1 | 6/2015 | Din | |
| 2015/0201500 A1* | 7/2015 | Shinar | H05K 3/4688 425/132 |
| 2016/0151978 A1 | 6/2016 | Lin | |
| 2017/0036209 A1* | 2/2017 | Brahmasandra | B01L 7/52 |
| 2017/0334139 A1* | 11/2017 | Ammi | B29C 64/336 |
| 2018/0085862 A1* | 3/2018 | Goh | B23K 35/3046 |
| 2018/0244862 A1* | 8/2018 | Price | C08J 3/124 |

OTHER PUBLICATIONS

Deng, et al., "Progress on the morphological control of conductive network in conductive polymer composites and the use as electroactive multifunctional materials", Progress in Polymer Science, vol. 39, pp. 627-655, 2014.

Muth, et al., "Embedded 3D Printing of Strain Sensors within Highly Stretchable Elastomers", Advanced Materials, vol. 26, pp. 6307-6312, 2014.

Leigh, et al., "A Simple, Low-Cost Conductive Composite Material for 3D Printing of Electronic Sensors", PLOS One, vol. 7, Issue 11, e49365 (Nov. 2012).

O'Brien, et al., "Miniaturization of Microwave Components and Antennas Using 3D Manufacturing", 9th European Conference on Antennas and Propagation (EuCAP), Lisbonne, May 13-17, 2015.

* cited by examiner

METHOD AND APPARATUS FOR MANUFACTURING A MECHATRONIC SYSTEM BY THREE-DIMENSIONAL PRINTING

CROSS-REFERENCE TO RELATED APPLICATIONS

This application is a National Stage of International patent application PCT/EP2017/063606, filed on Jun. 5, 2017, which claims priority to foreign French patent application No. FR 1655552, filed on Jun. 15, 2016, the disclosures of which are incorporated by reference in their entirety.

FIELD OF THE INVENTION

The invention relates to a method for manufacturing a mechatronic system, on a mechatronic system that can be obtained using such a method and to a manufacturing apparatus suitable for implementing such a method. The invention is based on three-dimensional (3D) printing techniques, also called additive manufacturing. It lends itself to very many applications, such as, for example, the manufacturing of:
- wearable physiological or activity sensors (heart rate, blood glucose, etc.);
- physiotherapy devices;
- two- or three-dimensional interaction interfaces;
- connected objects;
- etc.

BACKGROUND

These days, the additive manufacturing (or 3D printing) techniques are experiencing significant growth in various fields and are about to revolutionise the industrial sector, and also consumption practices among individuals. Various methods have been developed in recent years in order to design a wide variety of mechanical objects and structures. They make it possible to control the local or global mechanical properties or even the appearance of the objects (e.g. colour or textures). These methods however produce only passive objects, without the capacity to perceive or act on the environment.

To make these objects active, it is necessary to incorporate in them electronic components and functions which currently are manufactured separately, by essentially subtractive methods, then assembled with a mechanical structure in industrial production lines for the production of a final object. The incorporation of electronic functions in a non-planar mechanical structure and without assembly is a challenge.

In recent years, numerous players have addressed the use of polymer materials for the production of so-called flexible or organic electronics. This branch of electronics is relatively recent since the first conductive polymers were developed in 1977 and the first electronic components using these materials emerged in the mid-1980s. These days, organic electronics makes it possible to produce numerous electronic components such as organic field effect transistors (OFET), organic photovoltaic cells (OPV), organic light-emitting diodes (OLED), electrochemical biosensors, even actuators based on electroactive polymers (EARS). To produce such electronics, new methods have been developed, and some are now used on an industrial scale such as continuous strip or rotary printing (flexography, photogravure, etc.). Inkjet printing (IJP) and aerosol jet printing (AJP), which form part of the 3D printing methods, make it possible to produce some organic electronic components, notably sensors [Muth, 2014; Sitthi-Amorn, 2015] and are currently the subject of intensive researches in this area.

These methods however produce only components on planar substrates [Rossiter, 2009] or components which require additional assembly operations, not therefore allowing for the design of complete mechatronic 3D structures. Recently, it has been proposed to use conductive polymers with the 3D printing method by fused filament deposition (FDM, "Fused Deposition Modelling") to print pressure sensors on 3D objects [Leigh, 2012]. It has also been proposed to use functional thermoplastics for the printing of elementary components such as antennas [O'Brien, 2015].

The potential of polymer matrix composites for numerous applications such as sensors and actuators has already been demonstrated [Coiai, 2015], [Deng, 2014]. Furthermore, the science of nanocomposites and of nanoparticles (cationic nanoclays, anionic nanoclays, nanoparticles of noble metal, carbon nanotubes, etc.) has allowed for a better understanding and a better control of the methods for synthesising these materials. In particular, the thermoplastics incorporating carbon fillers are promising for the manufacture of sensors, for example deformation, force, temperature, electrochemical (liquid or gas detection), and other such sensors. Composites with a metal core (for example of copper) and a thermoplastic matrix, developed and integrated on an FDM printer, making it possible to produce strain gauges, are also known (see US 2014/328964).

At the present time, however, it is not possible to use 3D printing to manufacture complete mechatronic systems. Hybrid methods currently allow that, but with limited potential. The most advanced among them is the Voxel8 platform (www.voxel8.co), a spin-off from Harvard University, which combines FDM for the structure of the object, a metal ink for the conductive tracks of the circuit, and a discrete component positioning system.

The document US 2015/173,203 discloses a method for manufacturing a mechatronic system comprising an electrical component. Nevertheless, this electrical component is not a transducer. The document US 2015/173,203 also discloses an apparatus for implementing said method comprising three secured print heads.

Also known from the document WO 2014/209,994 is an apparatus for implementing a method without fused filament deposition comprising several independently driveable print heads.

SUMMARY OF THE INVENTION

The invention aims to overcome the abovementioned drawbacks and limitations of the prior art. More particularly, it aims to make it possible to manufacture, of a single piece and by one and the same 3D printing method, the mechanical subsystem and at least a part of the electrical subsystem of a mechatronic system. The term "electrical" should be interpreted in the broad sense, including functionalities of electronic and/or electromagnetic, even optoelectronic, type.

According to the invention, this aim is achieved by using the three-dimensional printing technique by fused filament deposition to manufacture both a mechanical structure and at least one electrical component (conductive track, resistor, sensor, etc.) secured to said structure, for example arranged on its surface. That requires the use of at least two distinct materials: a first material, electrically insulating, used to print the structure, and at least one second material, conductive or resistive, used to print the electrical component or components. The drawbacks of the hybrid techniques are thus avoided: lost overheads due to the assembly steps, mechanical fragility, bulk, etc.

A subject of the invention is therefore a method for manufacturing a mechatronic system comprising:
- a step of manufacturing a mechanical structure by three-dimensional printing by fused filament deposition of at least one first electrically insulating material; and
- a step of manufacturing at least one electrical component in contact with at least one element of said mechanical structure and secured therewith;

in which said step of manufacturing at least one electrical component is implemented by three-dimensional printing by fused filament deposition of at least one second material, conductive or resistive, directly in contact with said element of the mechanical structure; characterized in that said or one said electrical component is a transducer.

Another subject of the invention is a mechatronic system comprising an electrically insulating mechanical structure and at least one electrical component arranged in contact with at least one element of said mechanical structure and secured therewith, in which the mechanical structure and the electrical component are produced in a single block by three-dimensional printing of at least one first electrically insulating material forming said mechanical structure and of at least one second conductive or resistive material forming said electrical component; characterized in that said or one said electrical component is a transducer.

Yet another subject of the invention is an apparatus for implementing a method as mentioned above, comprising a three-dimensional printer of the fused filament deposition type having at least two distinct extrusion heads, that can be activated independently and adapted to deposit two different materials, said extrusion heads being arranged side-by-side with the same direction of extrusion and being borne by the same print carriage ensuring their simultaneous displacement, the print head also comprising a mechanism for displacing an inactive extrusion head in a direction away from said direction of extrusion when said or one other said extrusion head is active.

BRIEF DESCRIPTION OF THE DRAWINGS

Other features, details and advantages of the invention will emerge on reading the description given with reference to the attached drawings given by way of example and which represent, respectively.

DETAILED DESCRIPTION

Figure 1:
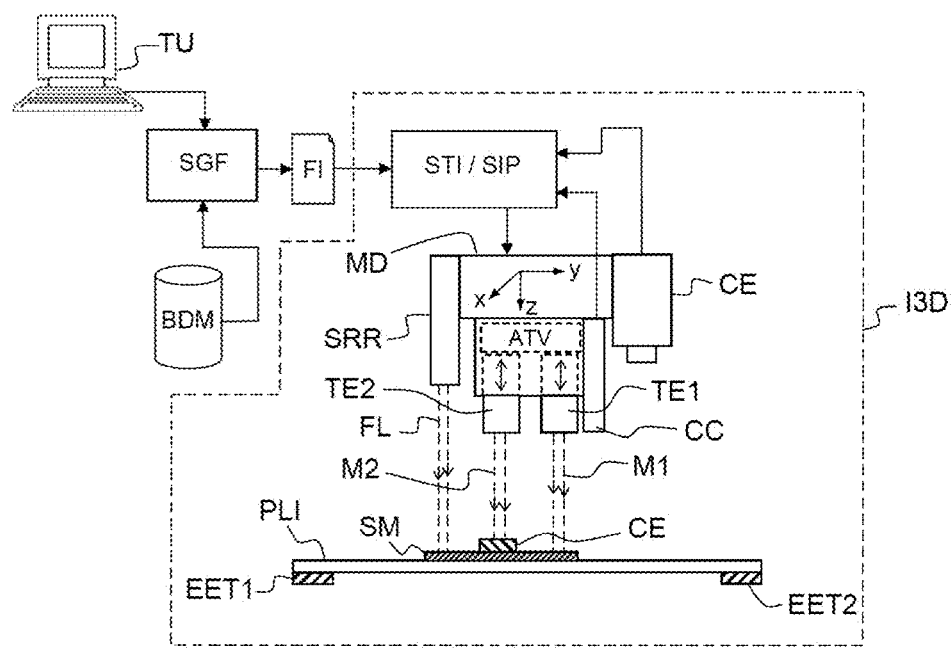
FIG. 1, a functional diagram of an apparatus according to an embodiment of the invention.

FIG. 1 illustrates, schematically, an apparatus for manufacturing three-dimensional mechatronic objects in accordance with an embodiment of the invention. These objects, manufactured by fused filament deposition and in particular the deposition of functional thermoplastics, comprise a mechanical structure, possibly articulated, and electronic components such as passive components (resistor, capacitor, antenna, etc.), sensors and actuators. The apparatus of FIG. 1 makes it possible to print complex 3D objects provided with capacities for interaction with their environment or the user, with short design and manufacturing cycles, reduced costs, great flexibility in the form of the objects and their use.

The apparatus essentially comprises a three-dimensional printer I3D, of the fused filament deposition type—or FDM type—suitable for implementing a method according to the invention. It can also comprise an interface for designing printed electrical/electronic components. This interface can comprise a database BDM, stored on a computer-readable medium such as a hard disk, containing a library of electronic components and transducers produced by three-dimensional printing by using functional thermoplastics, with their behavioural models. It can also comprise an SGF computing system (typically a computer) configured to received, as input via a user terminal and possibly a graphical interface, electrical and geometrical properties desired for an electrical component and using the models of the database to generate a print file FI containing all the instructions making it possible for the printer I3D to manufacture the duly designed electrical device. The steps culminating in the generation of the file FI are described below in this document, with reference to FIGS. 11A-11H and 13.

As represented in FIG. 1, the three-dimensional printer I3D comprises at least two extrusion heads TE1, TE2 arranged side-by-side, borne by the same print carriage C1, mobile in three orthogonal directions, x, y and z—the direction z corresponding to the direction of extrusion of the two extrusion heads—using a displacement mechanism MD, the structure of which is not represented in detail because it is conventional, driven by a computer system (computer or microcontroller card) SIP. The use of two distinct extrusion heads facilitates the deposition of at least two different thermoplastic materials: an insulating material M1 used to manufacture the mechanical structure SM of the mechatronic system, and a functional material (conductive or resistive) M2 used to manufacture at least one electrical component CE. The nature of these materials will be discussed in detail later. Generally, they will more often than not be thermoplastic polymer materials or composites having a thermoplastic polymer matrix. At least the material M2 will generally contain filters influencing its electrical properties, for example by making it conductive.

For the production of complex systems, comprising more than two materials, it will be possible to use more than two heads; one and the same head can be used to deposit several different materials, but that slows down the method (changes of material feeding the nozzle have to be made) and introduces a risk of contamination.

An actuation mechanism ATV makes it possible to adjust the relative vertical position (in z) of each head relative to the other heads. That in particular makes it possible to raise the inactive heads during the production of complex structures, in which the risk of collision between the extrusion heads and the elements already printed becomes significant. Even in the case of a simple layer-by-layer printing, residues present on the inactive heads are deposited accidentally and in an uncontrolled manner, which can affect the aesthetic properties (colour, texture, etc.) and above all the functional properties of the final object. For example, that may lead to short-circuits between conductive tracks.

Conventionally, each extrusion head TE1, TE2 comprises an extrusion nozzle having heating edges and a coil delivering to this nozzle a filament of the thermoplastic material M1, M2 to be deposited. Typically, each nozzle is mounted on a heating block, which transmits the heat to the extrusion edges by thermal conduction. The end of the filament in contact with the heating edges of the nozzle fuses, and the fused material is ejected from the nozzle under the effect of the pressure exerted by the as yet unfused part of the filament, which acts as a piston.

The control of the quantity of material by the printer, can be produced by a simple control of the weight, knowing the density of the filament, the weight of the support spool (standard, but can be deduced from its dimensions and from the density of the constituent material) and the diameter of the filament. The weight can be measured by a simple pressure sensor, or a more complex force sensor, which could itself originate from the 3D printing.

In the interests of accuracy, the real time measurement of the weight by the sensor can be complemented by a more conventional approach which consists in using a contact sensor to measure the number of rotations performed by the spool. On each turn, a counter is incremented by 1. The length consumed for a complete turn is equal to the perimeter of the spool; by multiplying this length by the section of the filament and by its density, the quantity of material deposited is obtained.

The reliability of the printing of the multi-material and functional structures depends in particular on the accuracy of the positioning of the different extrusion heads. The reliability is founded primarily on an automated calibration procedure for the spacing between the extrusion heads and the print platen PLI (in the direction z), and for the position of the heads in the plane (x,y) of the platen.

The calibration of the spacing between the extrusion heads and the platen height wise (z), and of the flatness of the platen, is generally done using an end-of-travel sensor and an adjustment of the corners of the platen. However, when using platens of large surface area (for example of the order of 20 cm×20 cm or more), it becomes difficult to ensure the flatness thereof and therefore the use of an end-of-travel sensor is not satisfactory. This is why an apparatus according to an embodiment of the invention preferably comprises a capacitive sensor CC secured to the print carriage. The use of the capacitive sensor makes it possible to calibrate the platen at several points without touching it and avoid the mechanical inaccuracies inherent in the mechanical end-of-travel sensors commonly used on servomotors. The capacitive sensor acts as a contactless switch. Unlike an inductive sensor, it detects non-ferrous materials such as glass, wood, skin, etc. This sensor will in fact quite simply replace the end-of travel contact by being installed directly on the print carriage.

The calibration of the position of the extrusion heads in the plane xy of the platen is important in order to correctly align the parts of structure manufactured with the different heads.

For a first layer (for example producing a surface of the mechanical structure), an initial calibration is performed using the capacitive sensor CC with integrated ground electrode, and metal ground electrodes (references EET1, EET2 in FIG. 1) placed in the corners of the platen. In effect, given constant distance between the sensor and the platen, the measured capacitance will be greater with a metal part between the two electrodes of the sensor rather than with the insulating coating or material of the platen.

For the subsequent layers, particularly when several print heads are used, and therefore several thermoplastic materials are printed, the alignment with the preceding layer and with the part printed with another material must be verified using a visual servo control implementing a camera CE linked to an image processing system STI (which, in the embodiment of FIG. 1, coincides with the driving computer system SIP). The visual servo control is implemented as follows:

an image of the print surface, on which at least one layer of material has been deposited, is acquired by the camera CE; possibly, several images can be acquired and averaged to improve the signal-to-noise difference;

a reference point is chosen on the image, automatically or manually (intervention of a user);

the position of this reference point on the image taken by the camera is compared to its position on the model of the last layer deposited, already in memory in the printer;

the position of the print carriage on the axes x and y is computed, and stored in memory;

the printing of the upper layer takes account of these possible shifts.

Preferably, as in the case of FIG. 1, the calibration camera CE is secured to the carriage, with a relative position in relation to the extrusion heads which is known. In a variant, the camera can be fixed and use a visual marker fixed to the print carriage to determine the relative position of the latter with respect to the point of reference on the image.

A method according to the invention necessarily implements at least two different materials, deposited in superimposed layers. Now, the adhesion between heterogeneous layers is not always satisfactory. For this reason, according to a preferred embodiment of the invention, an in-situ local annealing is performed at the same time as, or after, the deposition of a layer. The role of this local annealing is to provide the thermal energy to reinforce the adhesion between two constituent materials of the object; also, it can also make it possible to improve the intrinsic properties of the functional thermoplastic materials used.

The current FDM technology relies on the simple extrusion of layers of polymers adjacent or one on top of the other, and uses the latent extrusion heat, with or without the assistance of a heating plate, to fuse and weld the contiguous layers. This method induces an incomplete and non-uniform welding of the layers, and consequently reduces the mechanical properties because of a delamination between the layers, particularly in the case of a load applied at right angles to the surface of the layer or the direction of deposition of the filament. This is all the more true for the interfaces between two different materials, where the wetting between the two materials may be partial. Upon the deposition of the filament of a second on a layer of a first material, the filament of the second material is in the fused state and the wetting of the surface of the layer of the first material depends on the physical-chemical parameters of the two materials, such as the surface tensions of the two species, the surface roughness of the first material and the viscosity of the second material. Upon manufacturing followed by the cooling of the part, the delamination of the layers may then occur because of reduced contact surfaces, adhesion forces which are too weak, and differences between the thermal expansion coefficients of the two materials.

The annealing performed during the implementation of the invention relies on the local heating of the materials deposited through nanofillers (CM1, CM2 in FIGS. 2B and 2C), incorporated in the matrices of the materials (MM1, MM2 in these same figures) and capable of absorbing an irradiating electromagnetic beam of one or more given wavelengths. In the embodiment of FIG. 1, an electromagnetic radiation source SRR, for example an infrared laser, is fixed to the print carriage; the reference FL denotes the electromagnetic beam generated by the source (here a laser beam, but it could also be another type of radiation, for example microwaves, see for example WO2015130401, or radio frequencies).

The annealing can be performed during the printing of the layer concerned, according to different configurations:
- passage of the beam behind the active extrusion head and an action on the last layer deposited (configuration illustrated in FIG. 2A; in which the reference ΔT symbolically represents a localised heating);
- passage of the beam independently (extrusion head inactive), with an action on: the last layer or layers deposited in the case of a homogeneous material; the last layer or layers of the first material, situated below the second, by transmission through the latter, which is transparent to the wavelength used.

Figure 2A:
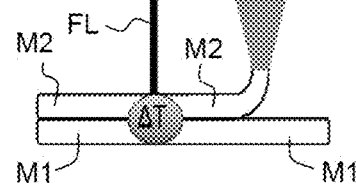
FIGS. 2A-2C, a schematic representation of a local annealing step of a manufacturing method according to one embodiment of the invention.
Figure 2B:
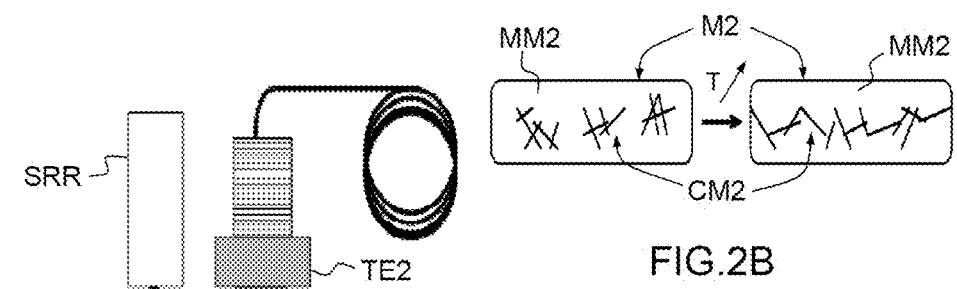
Figure 2C:
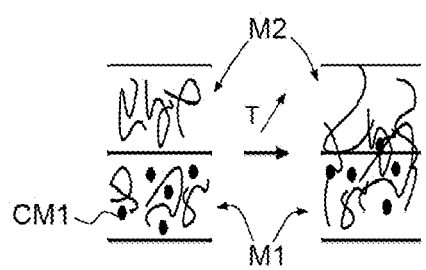

The annealing system has been represented very schematically in FIGS. 1 and 2A; in practice, it will comprise a radiation-emitting source, a focussing system (possibly incorporated in the source) and a system for guiding the beam to the point of impact, typically an optical fibre. In the embodiment of FIG. 2A, the annealing radiation source SRR is secured to the print carriage, but in other embodiments it can be independent.

The nanofillers absorbing the radiations can be selected from the group made up of carbon nanotubes, carbon black, buckyballs, graphene, supermagnetic nanoparticles, magnetic nanoparticles, metal nanowires, semiconductive nanowires, quantum dots, polyaniline (PANI), poly3,4-ethylenedioxythiophene polystyrenesulfonate and their combinations. The choice thereof will be made not only on the basis of their functionality thus transferred to the composite (for example an electrical conductivity) but also on the basis of the wavelength of the radiation corresponding to the maximum optical absorbance of the filter and therefore an optimal heating for a minimum power. For example, many fillers have a high absorbance to microwaves, for example metals, oxides, carbon (in particular carbon nanotubes "CNT") and conductive polymers (for example polypyrrole). The use of radiofrequency radiations (of the order of ten or so MHz) for its part proves suitable for ceramic fillers, such as SiC, ZnO or $TiO_2$. The use of an infrared laser is particularly effective for the matrices without filler or filled with fibres (for example carbon fibres). The fillers absorbing the radiations may already be present in the fused filament, or be deposited by spraying a suspension.

The annealing allows the interdiffusion of the polymer chains of the matrices between the adjacent layers (FIG. 2C), while limiting the heating of the rest of the part and thus significantly reducing the alteration of its dimensions, notably by creep and thermal cycling.

The distribution and the allocation of the functionalization fillers CM2 in the deposited filaments can be modified during the extrusion process, or not be optimal initially. The in-situ local annealing also makes it possible to homogenise the allocation of the fillers in the volume of the matrix, to reform a maximum of percolation networks (conductive, semiconductive or dielectric depending on the nature of the fillers), and therefore to improve the functional properties of the composite in the final structure. This is illustrated schematically in FIG. 2B.

Figure 3:
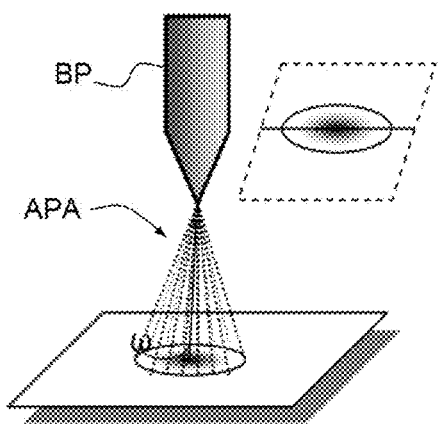
FIG. 3, a nozzle for spraying an adhesion promoter used in a manufacturing method according to an embodiment of the invention.

The deposition of an adhesion promoter at the interface between two parts made up of different thermoplastics, notably with different matrices in the case of the composites, can be used instead or in addition to the annealing by a radiation beam and to improve the adhesion between these two parts. This deposition is carried out using a nozzle spraying droplets, for example a valve with inlets for atomisation air, air for control and for promoting liquid adhesion. Such a device is represented very schematically in FIG. 3, where it is identified by the reference BP; the reference APA designates the jet of adhesion promoting agent.

It is known that the profile of deposition by spraying the adhesion promoter onto the surface is Gaussian and centred on the point facing the sprayer. In order to obtain the most uniform concentration profile possible, it is therefore best to programme passageways for the spraying nozzle. The adhesion promoter can be a homogeneous liquid or a suspension of nano or micrometric particles. In the latter case, it will of course be necessary to ensure having a homogeneous suspension beforehand, during its preparation, notably by use of sonication then centrifugation steps. In all the cases, the reaction of the adhesion promoter with the interfaces and/or the vaporisation of the solvent have to make it possible to ultimately leave a solid adhesion layer. In addition, provision is made for the spraying device to be able to make it possible to deposit absorbent particles, which, once sandwiched between two layers, of the same thermoplastic or of two different thermoplastics, will be able to be irradiated with the beam described previously and make it possible to improve the adhesion in this way.

As mentioned above, the structural material M1 of a mechatronic object according to the invention is an electrical insulation material. The structural material will be able to be a polymer, such as a thermoplastic, a thermoplastic elastomer, a ceramic, or a composite with thermoplastic or ceramic matrix. The thermoplastic matrix will be able to form part of the group, but not only, including acrylonitrile butadiene styrene (ABS), polylactic acid (PLA), polyamide (Nylon), polyimide (PI), polyethylene (PE), polypropylene (PP), polystyrene (PS), polytetrafluoroethylene (PTFE), polyvinylchloride (PVC), polyurethane (PU), polycarbonate (PC), polyphenylsylphone (PPSU), polyether ether ketone (PEEK) and the mixtures thereof. The ceramic will be able to be selected from the group composed of oxides, carbides, borides, nitrides and silicides. For example, the compatible ceramics include silicon nitride, PZT, aluminium oxide or hydroxyapatite. The composites used can incorporate any type of filler, which make it possible to modify and adjust its mechanical and thermal properties, such as ceramic or metal fillers, glass or carbon fibres, or even carbon particles.

The electrical component or components are produced in at least one functional thermoplastic material M2, which is generally a composite having properties such as a good electrical conductivity and/or a piezoresistivity or piezoelectricity and/or a good thermal conductivity and/or a high dielectric coefficient, etc. For example, for an electrically conductive thermoplastic, the fillers can form part of the group of carbon particles including carbon black, graphene, carbon nanotubes. To obtain a good thermal conductivity, metal fillers or nanotubes can be incorporated. This material will need to have the properties appropriate for forming via FDM, namely a melting point close to that of the structural material or materials and lower than 300° C., and a viscosity that is sufficiently low in the fusion zone. For that, one solution is, to the extent it is possible, to use a polymer matrix identical or similar to that of the structural material M1. Used alone or associated with another thermoplastic, functional or not, the functional thermoplastic M2 is involved in the manufacturing of an electrical or electronic component such as a passive component (resistor, capacitor, antenna, etc.), a sensor or an actuator.

To fully exploit the advantageous features of a device and a method according to the invention, it is possible to develop and incorporate new thermoplastic materials having functional properties making it possible to produce electronic components, sensors and actuators.

The incorporation of these materials requires exhaustive electrical and mechanical characterizations, in order to identify the parameters to be adjusted to guarantee an optimal functionality in the 3D mechatronic object. For that, the inventors notably focussed on the following composite thermoplastics:

material 1: matrix ABS/fillers CB (carbon black)
material 2: matrix PLA/fillers CB
material 3: matrix PI-ETPU (polyimide/engineering thermoplastic polyurethane)/fillers CB
material 4: matrix PLA/fillers CNT (carbon nanotubes)
material 5: matrix PLA/fillers graphene The materials that have been the subject of these characterization studies are thermoplastics filled with carbon particles having a high intrinsic electrical conductivity. These composites have an electrical conductivity which depends not only on the nature of the fillers, but also on the concentration and distribution thereof in the thermoplastic matrix. The concentration of the fillers has to be sufficient to allow the formation of conduction or percolation path, but be sufficiently low for the viscosity of the filament to allow the continuous extrusion of the fused filament in a temperature range lower than 300° C. The distribution of the fillers in the composite filament depends on the method by which the composite filament is formed (single- or dual-screw extrusion), on the control of the process parameters and on the preparation of the particles with a potential surface functionalization. A uniform distribution and allocation of the fillers allows a greater number of percolation paths and therefore a better electrical conductivity of the composite. However, ultimately, the electrical properties of the composite are also modulated by the process and geometrical parameters used in the printing of the 3D object by FDM.

As indicated above, the viscosity, flexibility and hardness of the five composites studied is not the same because of their matrices, their fillers, and the way they are formed which differ. For that, the process parameters have to be adapted in order to allow a continuous extrusion of the filament. For the materials studied, the extrusion temperature depends mainly on the thermoplastic matrix used: 210-220° C. for filled PLA, 230° C. for filled ABS and 220° C. for filled PI-ETPU. It is clear however that these values have been optimised by the manufacturers, and in particular by adopting the appropriate concentration of fillers.

The rate of displacement of the nozzles during the printing, or print speed, is governed by parameters other than viscosity however.

The extrusion of the filament is made possible by virtue of the meshing of the filament, pinched between a fixed wheel and a mobile wheel, and the upper, solid part of the filament forms a piston on the lower, liquid part. The flexible filaments have a tendency to buckle under the effect of compression stress, and despite a design of the extrusion head that makes it possible to limit the lateral movements of the filament. The lowering of the speed, typically 20 mm/s, makes it possible to lower the time for the fused filament to be extruded, and to remain below creep limit constraint for the flexible filaments.

The carbon nanoparticles, for example CNT and graphene, are not only good electrical conductors, but also good thermal conductors. An excessively low print speed risks allowing the core of the fused filament to cool by internal thermal conduction, despite the contact on the edges with the hot nozzles. This phenomenon makes it necessary to limit the transit time of the filament in the nozzle, such that it is long enough to allow the liquefaction of the filament, and short enough to prevent the resolidification of the core. In this case, a high print speed, typically 80 mm/s, makes it possible to have a continuous extrusion and avoid clogging of the nozzle.

One final parameter to be taken into account as a function of the nature of the thermoplastic matrix, and of its behaviour in the fused state, is the distance between the nozzle and the platen for the first layer. In effect, a high viscosity and elasticity necessitate a greater spacing, as for ABS compared to PLA in the first case, and for PI-ETPU compared to PLA in the second case.

Figures 4A, 4B, 4C:
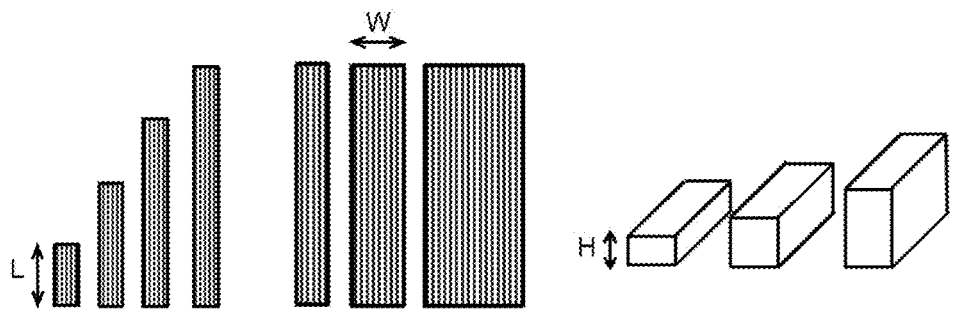
FIGS. 4A-4E, different conductive patterns produced by a manufacturing method according to an embodiment of the invention.
Figures 4D, 4E:
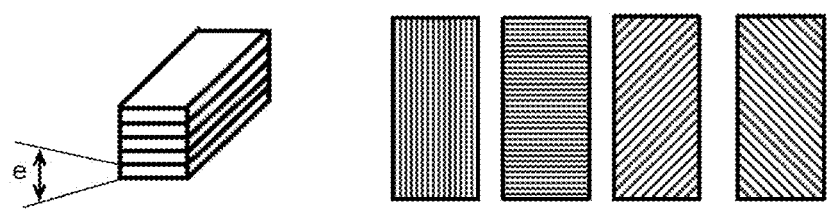

To produce mathematical models of the electrical components that can be manufactured in accordance with the invention, patterns in rectangular bar form were produced from the above five materials, and characterized. These patterns differ by their length L (FIG. 4A), width W (FIG. 4B), overall thickness H (FIG. 4C), thickness e of each individual layer, or "stratum" (FIG. 4D) and print direction (FIG. 4E). An exhaustive electrical characterization made it possible to classify the materials as a function of their conductivity and establish laws linking the resistance of the patterns to the geometrical parameters cited above.

Figure 5A:
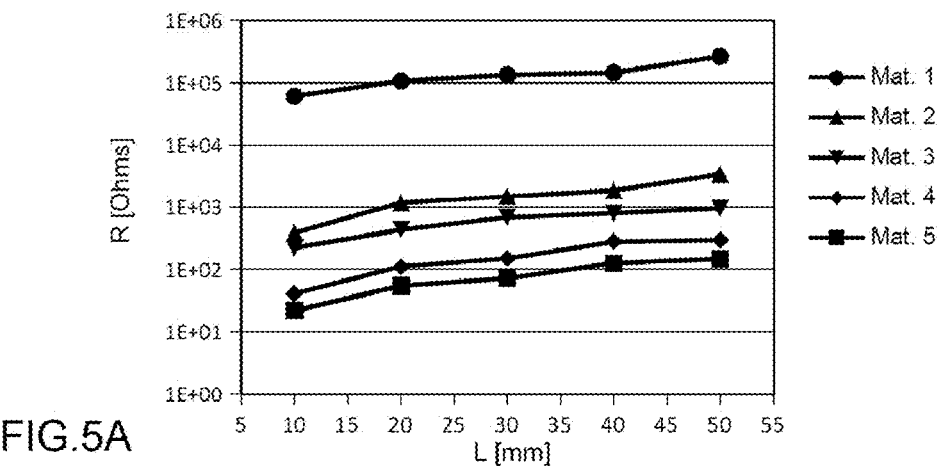
FIGS. 5A-5C, graphs illustrating the trend of the resistance of different resistive patterns produced by a manufacturing method according to an embodiment of the invention as a function of their geometrical parameters.
Figure 5B:
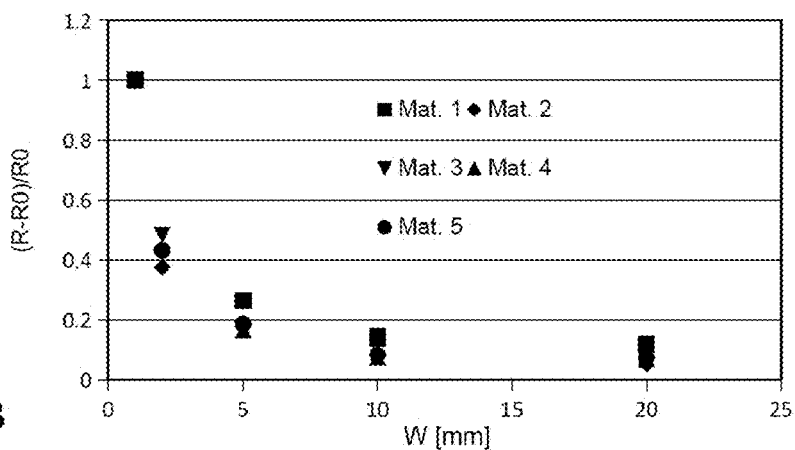
Figure 5C:
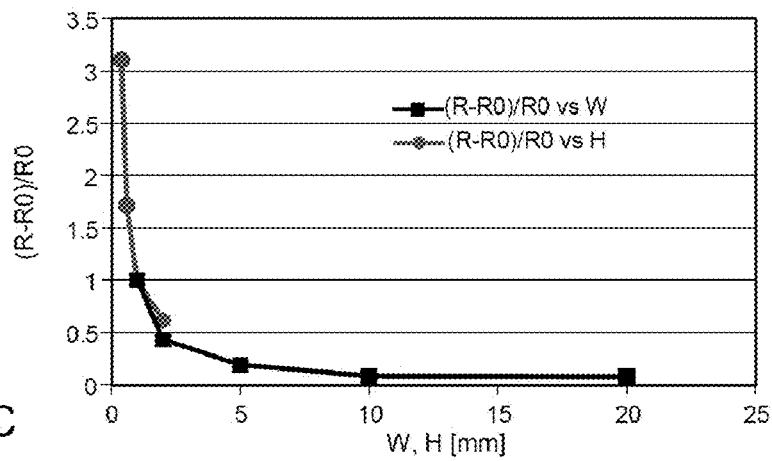

FIG. 5A shows the trend of the resistance from a rectangular bar (W=20 mm, H=400 μm, print direction relative to the length of the bar=0°, T=200 μm) as a function of its length L for the 5 materials studied. The most conductive materials are easily identifiable: the conductivity decreases when the index of the material increases from 1 to 5. FIG. 5B shows the trend of the average relative resistance of the bars (L=50 mm, H=0.4 mm, print direction relative to the length of the bar=0°, T=200 μm) as a function of its width for the 5 materials studied. The average relative resistance is given by (R−R0)/R0, where R is the resistance of the bar considered and R0 that of a reference bar having a length equal to 10 mm. The inverse law trend is valid for all, demonstrating their ohmic behaviour. FIG. 5C shows the trend of the average relative resistance of the bars as a function of their width (L=50 mm, H=0.4 mm, print direction relative to the length of the bar=0°, T=200 μm) and their height (L=50 mm, W=20 mm, print direction relative to the length of the bar=0°, T=200 μm) for the material 4. The resistance is inversely proportional to the width and to the height of the bar, with unit of power.

The relative variation of resistance R of the patterns as a function of the length L, of the width W and of the height H, is virtually identical for the five composites. Qualitatively, in FIGS. 5A-C, it will also be noted that the filled thermoplastics, once printed, behave like ohmic conductors, and that the resistance obeys the general expression:

$$R = \frac{\rho \cdot W \cdot H}{L},$$

in which ρ is the resistivity of the bar measured in its length. This ohmic behaviour is moreover supported by numerous current-voltage characteristics produced on the different samples manufactured.

The resistance varies also as a function of the print direction, and according to the law above. It is possible to empirically link this variation to the intrinsic resistivity of the printed pattern, that is to say to the microstructure thereof. The results obtained are reproduced in table 1 below. The resistivity of the bar increases when the print direction changes from 0° to 45° then 90°. This angle is evaluated in relation to the length of the bar.

TABLE 1

Resistivity of the conductive thermoplastics and print directions.

| Material | Volume resistivity of the filament | Resistivity of the printed pattern |
|---|---|---|
| 1. ABS/CB | 10 000 Ohm · cm | 4 300 Ohm · cm +/− 1800 Ohm · cm at 0° <br> 7 000 Ohm · cm at 45° <br> 10 000 Ohm · cm +/− 1200 Ohm · cm at 90° |
| 2. PLA/CB | 15-115 Ohm · cm | 15 Ohm · cm +/− 5 Ohm/cm at 0° <br> 30 Ohm · cm at 45° <br> 40 Ohm · cm +/− 5 Ohm/cm at 90° |
| 3. PI-ETPU/CB | 100 Ohm · cm | 60 Ohm · cm +/− 30 Ohm · cm at 0° <br> 140 Ohm · cm at 45° <br> 350 Ohm · cm +/− 50 Ohm · cm at 90° |
| 4. PLA/CNT | 0.75 Ohm · cm | 2.3 Ohm · cm +/− 1.2 Ohm · cm at 0° <br> 4.6 Ohm · cm +/− 1 Ohm · cm at 90° |
| 5. PLA/graphene | 1 Ohm · cm | 1.7 Ohm · cm +/− 0.5 Ohm · cm at 0° |

The influence of the thickness "e" of the strata printed on the resistance is however negligible for most materials, except for the material 3. The reduction of the resistance by a factor 2.5 when e varies between 100 and 300 μm for the material 3 could be explained by a vertical continuity between the layers (fewer homogeneous layer-layer interfaces) which potentially allows a greater number of percolation paths. In this case, the use of a local annealing, as described in the present invention, would make it possible to form new percolation paths at the inter-layer interfaces and would significantly improve the electrical conductivity of the printed pattern.

In order to characterise the piezoresistivity thereof, the materials 1 to 5 were used to manufacture dumbbell-form uni-axial tensile test specimens, printed by FDM.

Figure 6A:
FIGS. 6A and 6B, tensile test specimens equipped with uniaxial strain gauges, produced by a manufacturing method according to an embodiment of the invention.
Figure 6B:
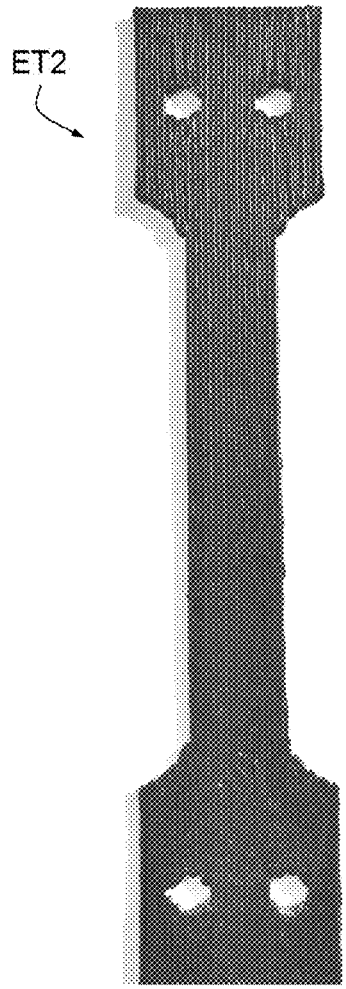

These test specimens were designed by exploiting the difference in resistivity as a function of print direction, and with dimensions conforming to the ASTM D638 standard, that is to say, for the useful part: L=50 mm, W=10 mm, H 300 μm. For each material, copies were printed entirely with print directions, measured relative to the length of the test specimen, of 0°, 45° or 90°. Examples ET1 (0°), ET2 (90°) of the manufactured test specimens are illustrated in FIGS. 6A and 6B.

The tensile stress was exerted using weights suspended vertically from the bottom of the sample, while the height of the sample was fixed via jaws to the frame. The suspended weights were 100 g, 200 g, 500 g and 1 kg. Assuming that the test specimens are defect-free, the strain would be concentrated in the useful part, and the strain applied would vary between 3 and 33 MPa.

Figure 7A:
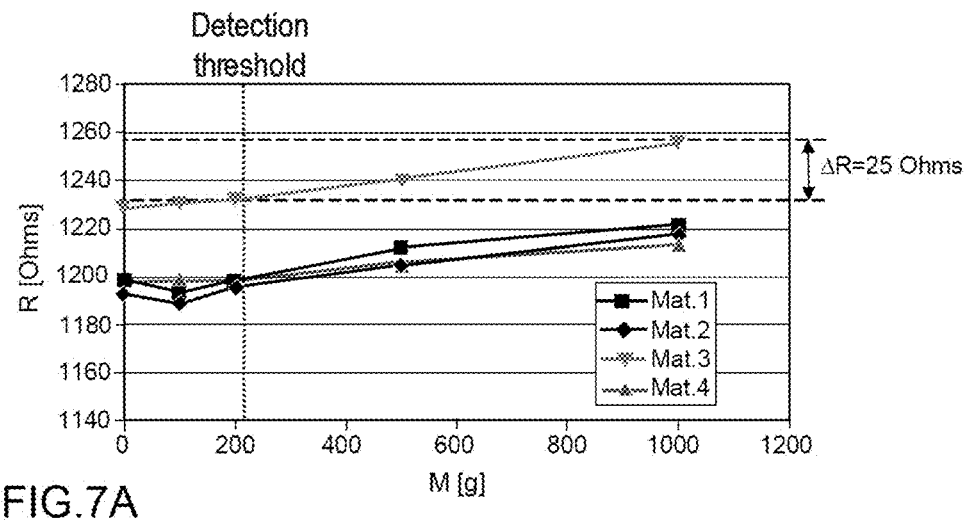
FIGS. 7A-7C, graphs illustrating the results of measurements performed during tensile tests on test specimens of the type illustrated in FIGS. 6A and 6B.
Figure 7B:
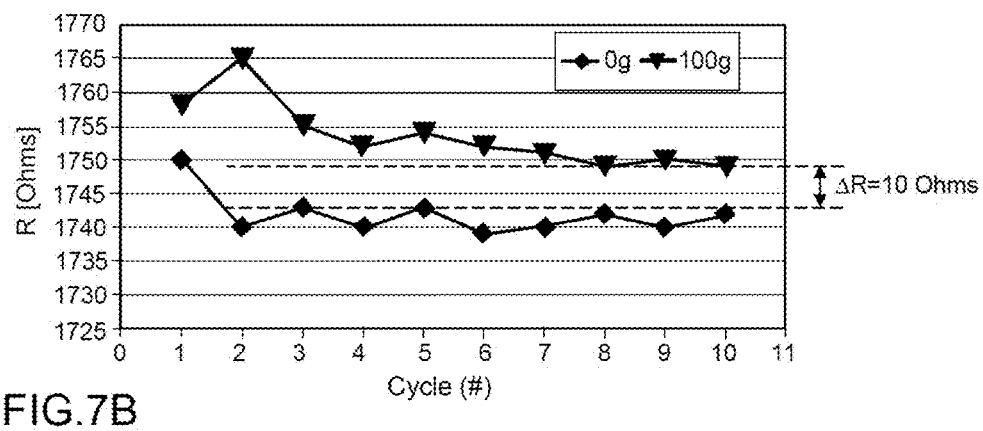
Figure 7C:
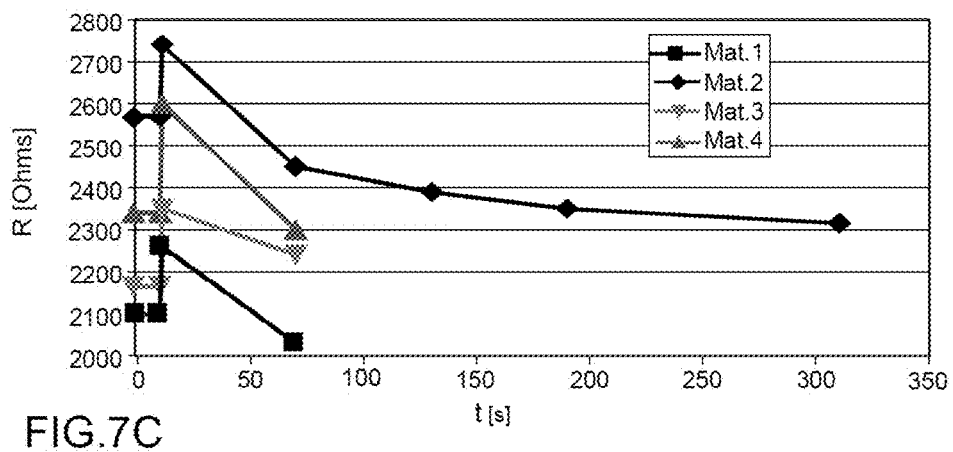

The results of the tests are illustrated in FIGS. 7A-7C.

FIG. 7A illustrates the trend of the electrical resistance R of the tensile test specimens in material 2 as a function of the mass M of the vertically suspended weight. The filling rate is 100%, the test specimen is therefore solid.

FIG. 7B illustrates the trend of the electrical resistance of the tensile test specimens, under zero or 100 g loading, during a mechanical loading/unloading cycle. The test specimens considered here have a filing rate of 80%, which means that there is a gap between the filaments, or stria, which form the body of the test specimen, of which approximately 20% is made up of empty spaces.

FIG. 7B illustrates the trend in time t of the electrical resistance of the tensile test specimens following the removal of a 100 g loading. Following an abrupt increase, the resistance decreases gradually to the rest value.

Among the materials studied, the material 3 demonstrated a piezoresistive behaviour with threshold effect, when the test specimen is printed at 90°, as reported in FIG. 7A. The threshold from which the resistance variation appears can be lowered by reducing the filling rate in the printing by FDM, that is to say by modulating the quality of the contact between the stria. If the filling rate is high, there will be overlap between the adjacent stria. The more this rate decreases, with the extrudate thickness being constant, the more the part where there is overlap decreases and the interface between the adjacent stria show holes or porosities, where air is trapped. The rate of porosity is therefore an important parameter making it possible to control the resistance and the piezoresistivity threshold of the printed pattern. After a burn-in cycle (breaking of the weak paths which occurs during first uses, leading to rapid variations of the electrical properties followed by a stabilization phase), it is noted that the resistance variation appears from 100 g of loading for a bar with a filling rate of 80%, with a good repeatability and an endurance of at least 10 cycles (cf. FIG. 7B).

The same piezoresistive behaviour is observed for the test specimens whose stria are printed at a printing angle of 90° relative to the length of the test specimen with the material 5. However a phenomenon of relaxation of the elastomer matrix following the loading or unloading is observed. For the unloading, this phenomenon induces an abrupt increase in the resistance followed by a logarithmic decrease to the rest value (see FIG. 7C). This temporal response is thus a not-inconsiderable problem in the reliability of the measurement and its use to produce a sensor.

The behavioural models and the laws established for the piezoresistivity of the material 2, and those established for the resistivity of the conductive thermoplastics make it possible to produce sensors which exploit these properties.

Figure 8:
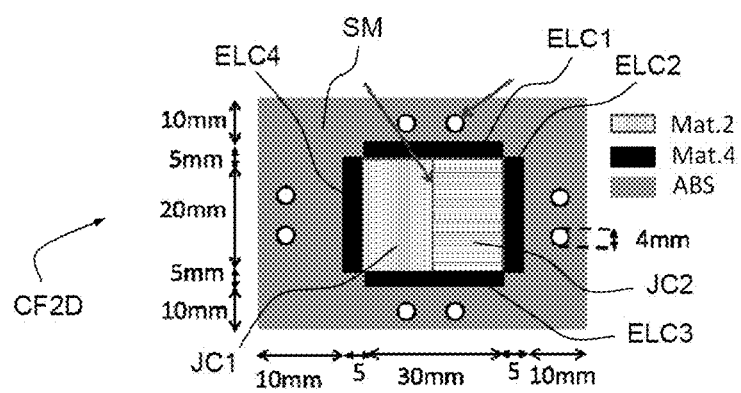
FIG. 8, a two-dimensional flexural sensor produced by a manufacturing method according to an embodiment of the invention.

FIG. 8 shows a functional two-dimensional flexural sensor CF2D, entirely printed by FDM with 3 different thermoplastic materials. This component in effect comprises a structure SM of insulating thermoplastic (ABS), 4 contact electrodes ELC1, ELC2, ELC3, ELC4 of conductive thermoplastic (material 4), and 2 central parts JC1, JC2 of filled thermoplastic having a piezoresistive behaviour (material 2), printed according to orthogonal printing directions, forming strain gauges, supported by the mechanical structure SM and whose sensitivity axes (determined by the printing direction, and therefore by the alignment of the constituent filaments) are mutually right-angled.

In order to avoid the dead times necessary for the changes of the coil, the sensor was printed by using three extrusion heads, one for each material. A thin layer of adhesion promoter was deposited at the heterogeneous interfaces.

The central parts of the sensor are respectively a rectangle JC1 of material 2 printed at 0° and a rectangle JC2 of material 2 printed at 90°, with a thickness of 600 μm. According to the characterization results, only the rectangle whose printing direction is at right angles to the direction of tensile stress produces a change of electrical resistance. The other block retains the same resistance. The juxtaposition of these two blocks therefore makes it possible to measure a strain along the axis x or the axis y, even a bi-axial tensile strain.

When the substrate of ABS undergoes a flexural strain, its top face is tensile stressed. This stress is transmitted to the blocks of material 2 by shearing at the interface. The results obtained with this sensor, and demonstrating its functionality, are presented in Table 2 below:

TABLE 2

| Deformation ($\varepsilon$) | Large dimension (60 mm) | Small dimension (50 mm) |
| --- | --- | --- |
| $\varepsilon = 0$ | 409 Ω | 630 Ω |
| Top layer under tensile strain: $\varepsilon > 0$ | 456 Ω | 723 Ω |
| Top layer under compression: $\varepsilon < 0$ | 370 Ω | 273 Ω |

Figure 9A:
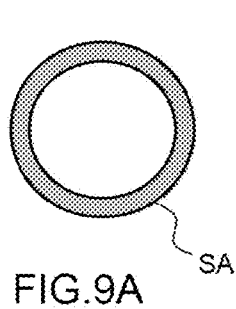
FIGS. 9A-9E, the manufacturing sequence for a multi-axial force sensor produced by a manufacturing method according to an embodiment of the invention, and FIG. 9F, a lateral view of this sensor.
Figure 9B:
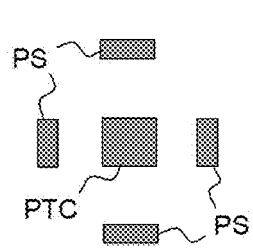
Figure 9C:
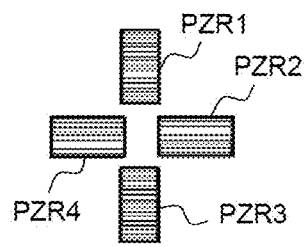
Figure 9D:
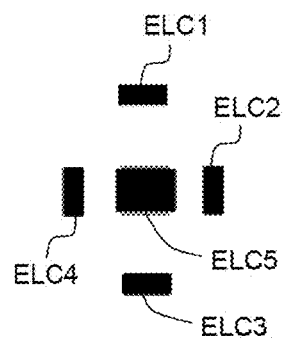
Figure 9E:
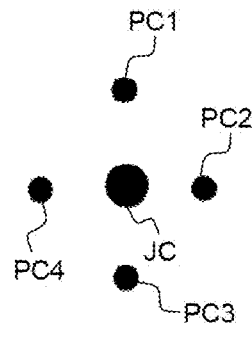
Figure 9F:
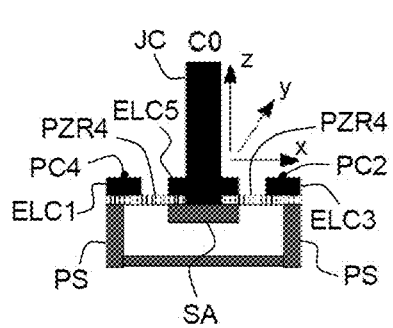

The freedom of form permitted by the method and the availability of conductive and piezoresistive thermoplastics, allows the production of multidimensional force sensors. FIG. 9F shows a lateral view of such a sensor in the form of a mini-joystick that can translate the load applied to the central connector and its components x and y. This sensor has an insulating mechanical structure comprising an annular substrate SA, support pillars PS and a central platform PTC of insulating material; piezoresistive elements PZR1-PZR4 forming suspended bridges produced using a printed support of sacrificial, for example soluble, polymer; contact electrodes EC1-EC5, the central joystick JC and conductive pillars PC1-PC4 for attaching the connector. FIGS. 9A-9F show these different elements separately.

Figure 10:
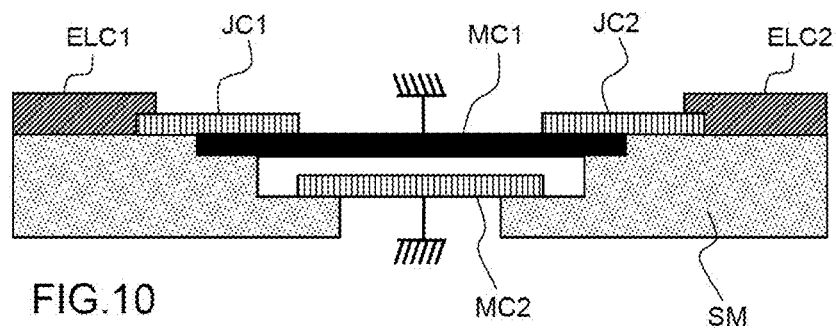
FIG. 10, a cross-sectional view of an acoustic sensor produced by a manufacturing method according to an embodiment of the invention.

FIG. 10 illustrates an acoustic sensor of piezoresistive type, also produced by a printing method according to the invention. It comprises an insulating mechanical structure SM, two contact electrodes ELC1, ELC2 of conductive thermoplastic, two conductive membranes MC1, MC2, also of conductive thermoplastic, forming the two foils of a capacitor, and strain gauges JC1, JC2, each linked to a respective contact electrode and to the conductive membrane MC1. The strain gauges make it possible to measure the deformations of the membrane MC1 under the effect of an acoustic wave.

As described above, a design interface is advantageously provided to facilitate the design of the printed electrical components. This interface is a computer system (computer, computer network, microprocessor card, etc.) programmed to receive, as input, parameters of an electrical component to be manufactured, such as the desired electrical properties, the position of its contact points, its location in or on the surface of a mechanical structure etc. and to supply at the output through the application of appropriate algorithms, a print file (typically GCode format) which makes it possible to drive the three-dimensional printer.

Figure 13:
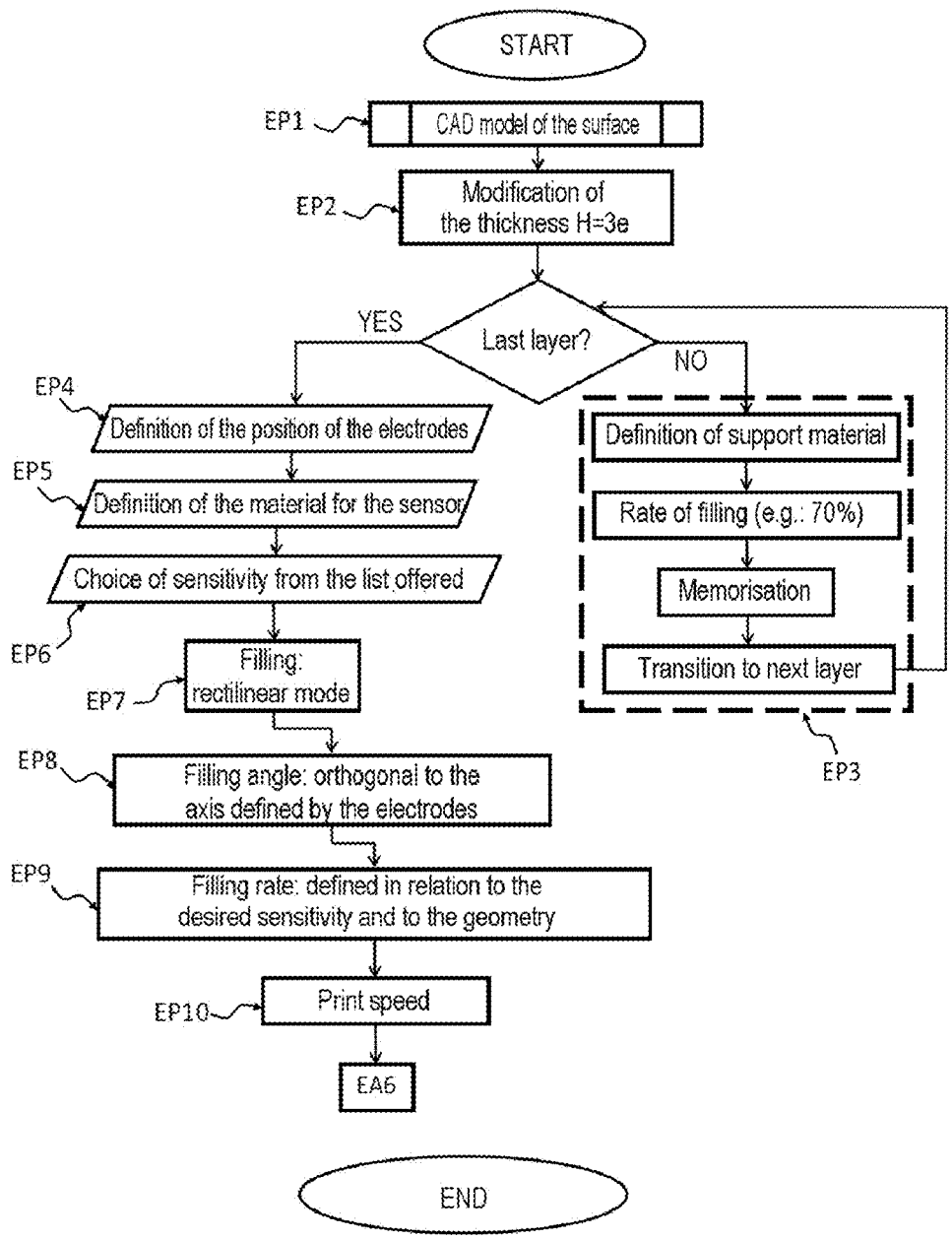
FIG. 13, a flow diagram illustrating an algorithm for generating a print file for a piezoresistive deformation gauge produced by a manufacturing method according to an embodiment of the invention.

The flow diagrams of FIGS. 11A to 11H illustrate, by way of nonlimiting example, the algorithms that make it possible to culminate in the print file for a simple electrical component, namely a resistor deposited on an insulating substrate. FIG. 13 illustrates, also as a nonlimiting example, an algorithm making it possible to obtain the print file for an axial deformation gauge.

Figure 11A:
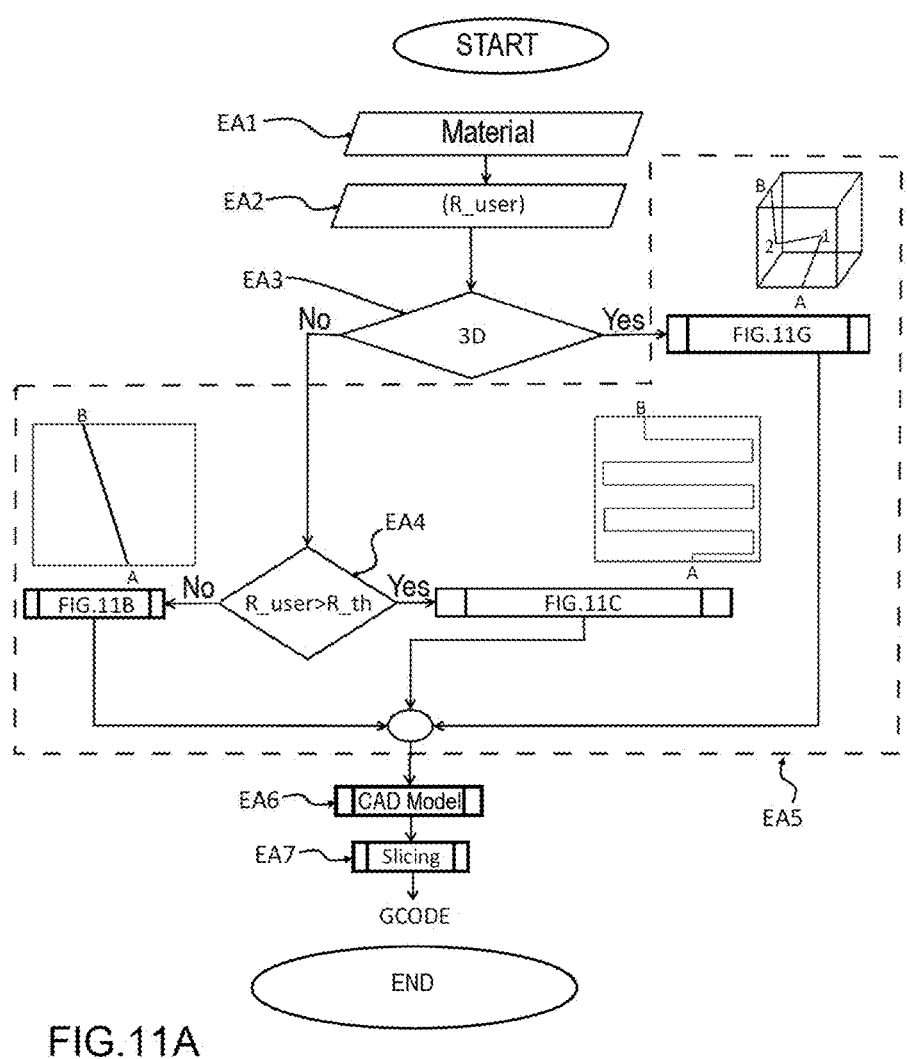
FIGS. 11A to 11H, flow diagrams illustrating an algorithm for generating a print file for an electrical resistor produced by a manufacturing method according to an embodiment of the invention.

A resistor manufactured by three-dimensional printing can be two-dimensional (that is to say planar, deposited on a surface) or three-dimensional—therefore passing through non-coplanar points, which may be imposed. In the case of a two-dimensional resistor, it is possible to adopt a linear geometry—for low resistance values—or zigzag or serpentine geometry—for higher resistance values. These three different cases require different design algorithms. Thus, as illustrated in FIG. 11A, the user of a design interface according to the invention first of all defines the thermoplastic material to be used (step EA1), whose properties are known and stored in the model database BDM, and the resistance value R_user to be reached (step EA2), then (EA3) he or she indicates whether the resistor is three-dimensional or must observe imposed points of passage. In the affirmative, the design interface will apply a three-dimensional resistor design algorithm, illustrated in FIGS. 11G and 11H. Otherwise, the system will independently determine (EA4), as a function of the value R_user, whether it is appropriate to produce a linear geometry (for example if R_user is below a predefined threshold R_th), in which case it will apply the algorithm illustrated in FIG. 11B, or else a zigzag geometry (for example if R_user is above or equal to R_th), in which case it will apply the algorithm illustrated in FIGS. 11O to 11F. The choice between a linear and zigzag geometry can also take account of other parameters, for example of footprint, or will be left to the assessment of the user.

Whatever the geometry chosen, the design algorithm applied defines the volume of the resistor to be manufactured (EA5). Then (step EA6), a (computer-assisted design) modeler CAO generates a triangular meshing of this volume in triangle form, which is typically stored in the form of a stereolithography file in STL format. Next (step EA7) there is a slicing of the volume defined by the STL file, which makes it possible to define each slice of material deposited by the extrusion head and associate therewith a trajectory of displacement of the print head. The slicing is done by software that is known per se, dependent on the printer, which preferably also makes it possible to parameterize the latter by determining, in particular, the temperature of the edges of the nozzle, the rate or the angle of filling, etc.

All of the displacements of the nozzle and the machine parameters are stored in the print file FI, for example in GCode format.

Figure 11B:
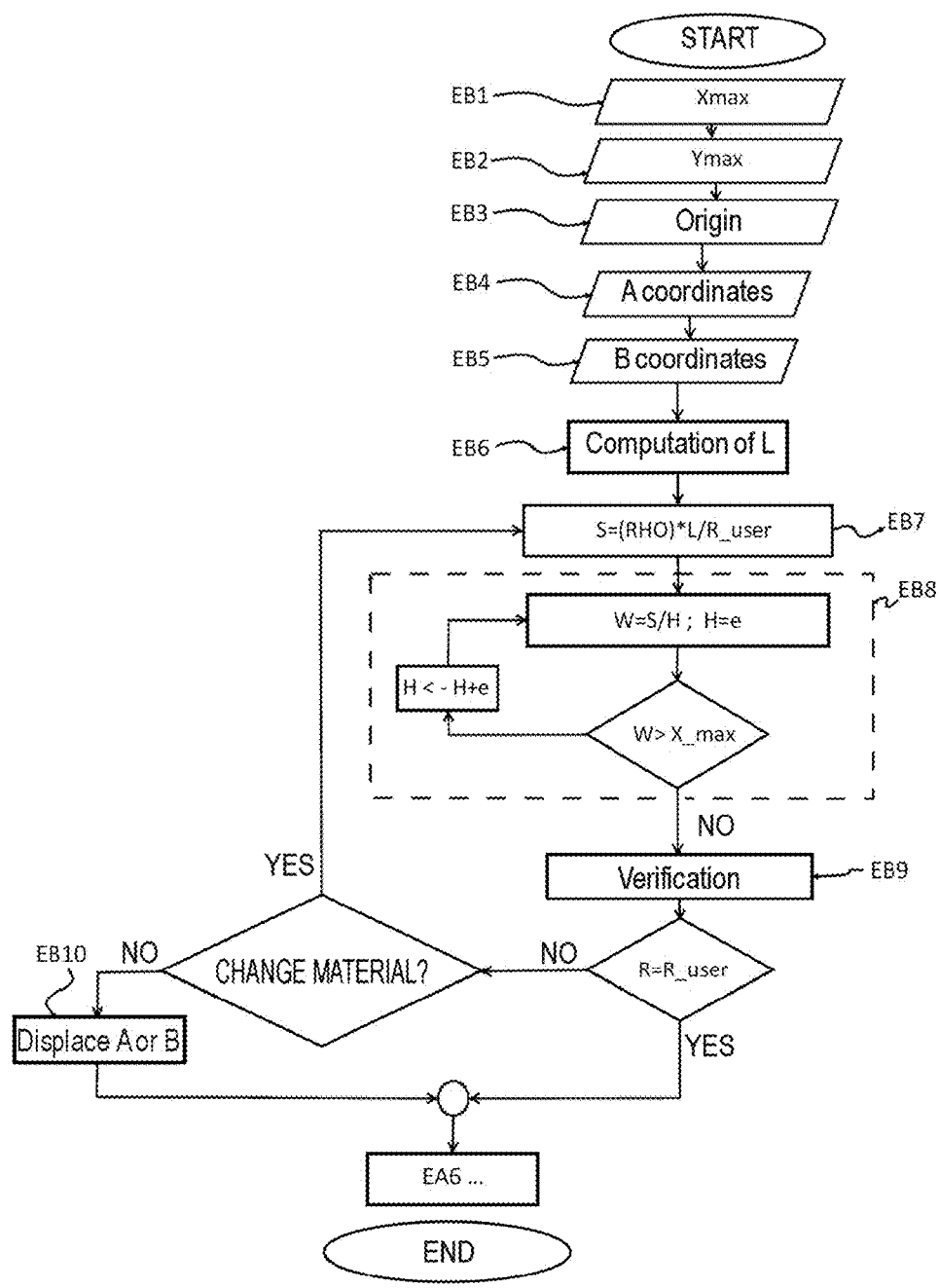
Figure 11C:
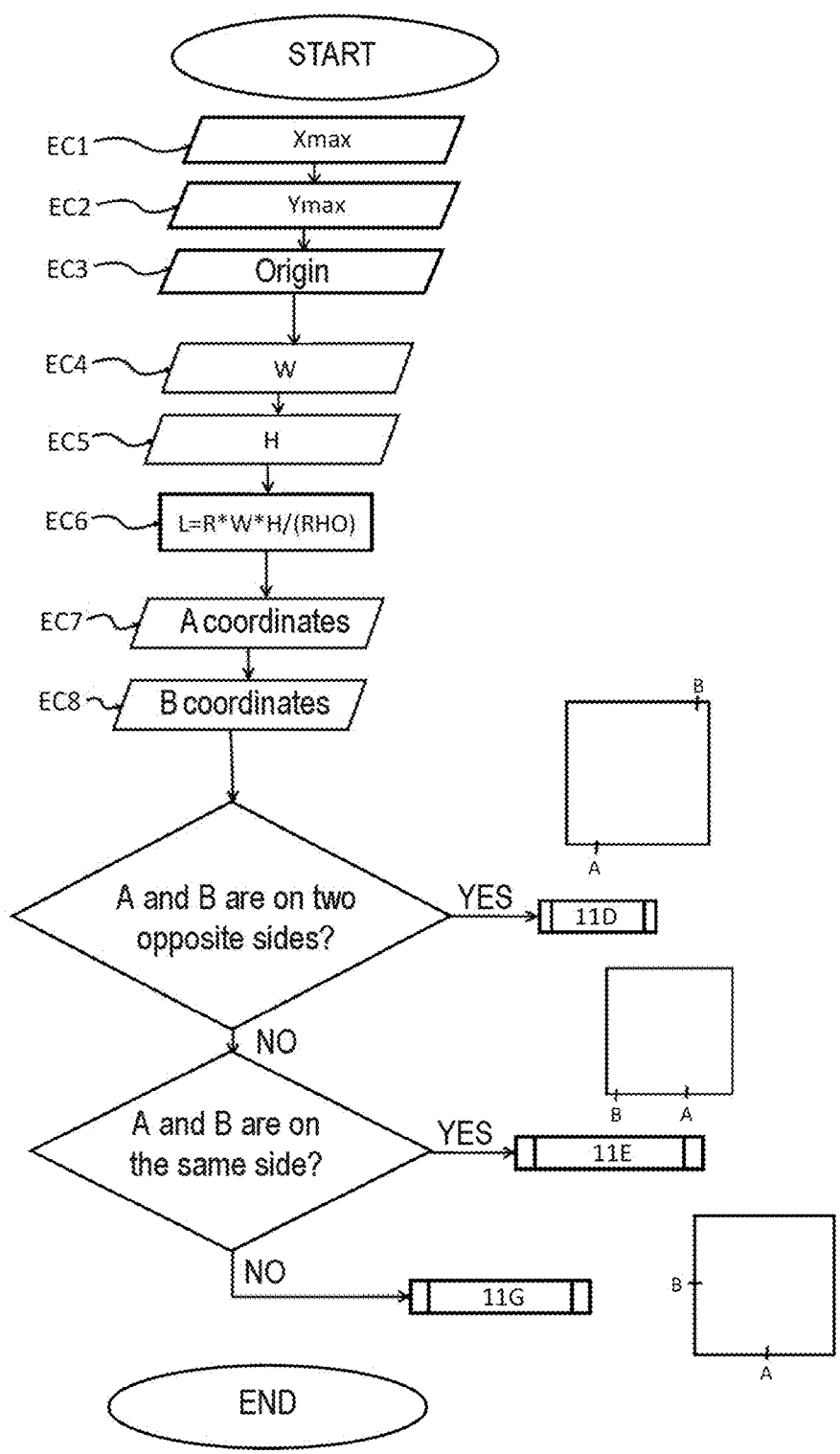

The flow diagram of FIG. 11B illustrates the design algorithm for a linear resistor.

To begin, the user supplies as input to the computer system, the width Xmax (EB1) and the length Ymax (EB2) of the region, assumed rectangular, containing the resistor, the position of the point serving as origin for the reference frame defined in this region (EB3), and the coordinates of the contact points A and B of the resistor in this reference frame (EB4, EB5), these points are generally situated on sides of this rectangular region in any case that will always be the case hereinbelow. The computer system then computes the length L of the segment AB (EB6), then the section $S=\rho \cdot L/R\_user$ necessary to obtain the desired resistance (EB7), ρ being the resistivity of the material, extracted from the database BDM.

The section S is the product of the width W of the resistor by its thickness H, these two quantities having to be determined. The thickness H of the resistor is an integer multiple of the thickness e of a slice of material deposited by the extrusion head, whereas the width W lies between a minimum value Wmin that is a function of the extrusion head and the allowable width of the resistor, Wmax. First of all, it is assumed that H=e, and the corresponding width is computed: W=S/H. If a value higher than the allowable maximum width Wmax is obtained, H is incremented by the value e, and so on. Although that is not illustrated in the figure, it is possible, even with H=e, to obtain W<Wmax. That means that R_user is too high; it is therefore necessary to either increase the length L by displacing one of the contact points (or both), or to change material, or to use a zigzag geometry. In principle, this situation should not arise if the linear geometry has been selected automatically by the algorithm of FIG. 11A. These operations constitute the step EBB.

Next (EB9), there is a check to see that the value $R=RHO \cdot L/S$ is indeed equal to R_user. If not, the user has the option to change the material used, in which case the algorithm resumes from step EB7; if he or she does not want to do that, the computer system displaces one of the points A and B (or both) to modify the length L until R=R_user (EB10).

Figure 11D:
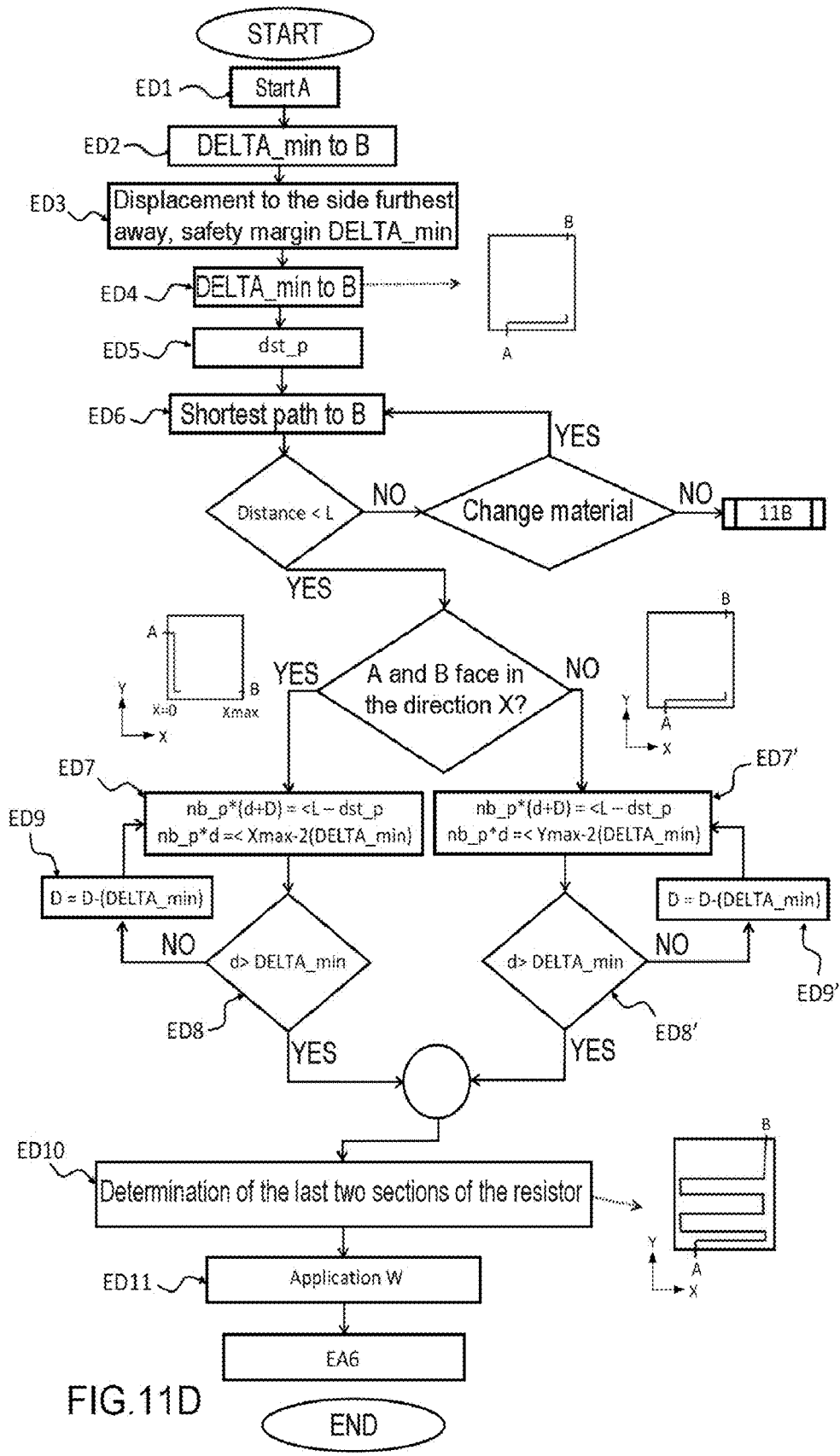
Figure 11E:
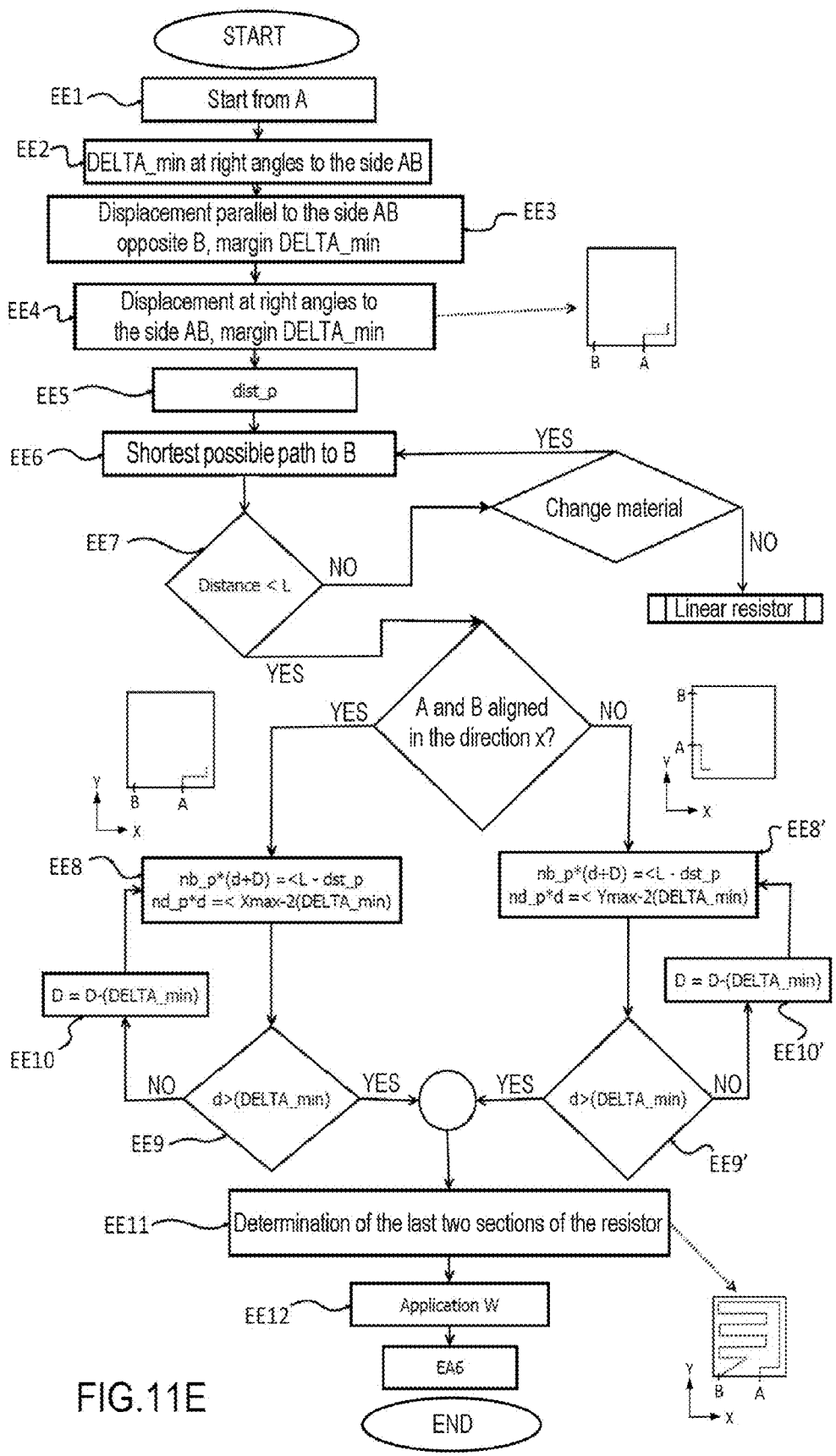
Figure 11F:
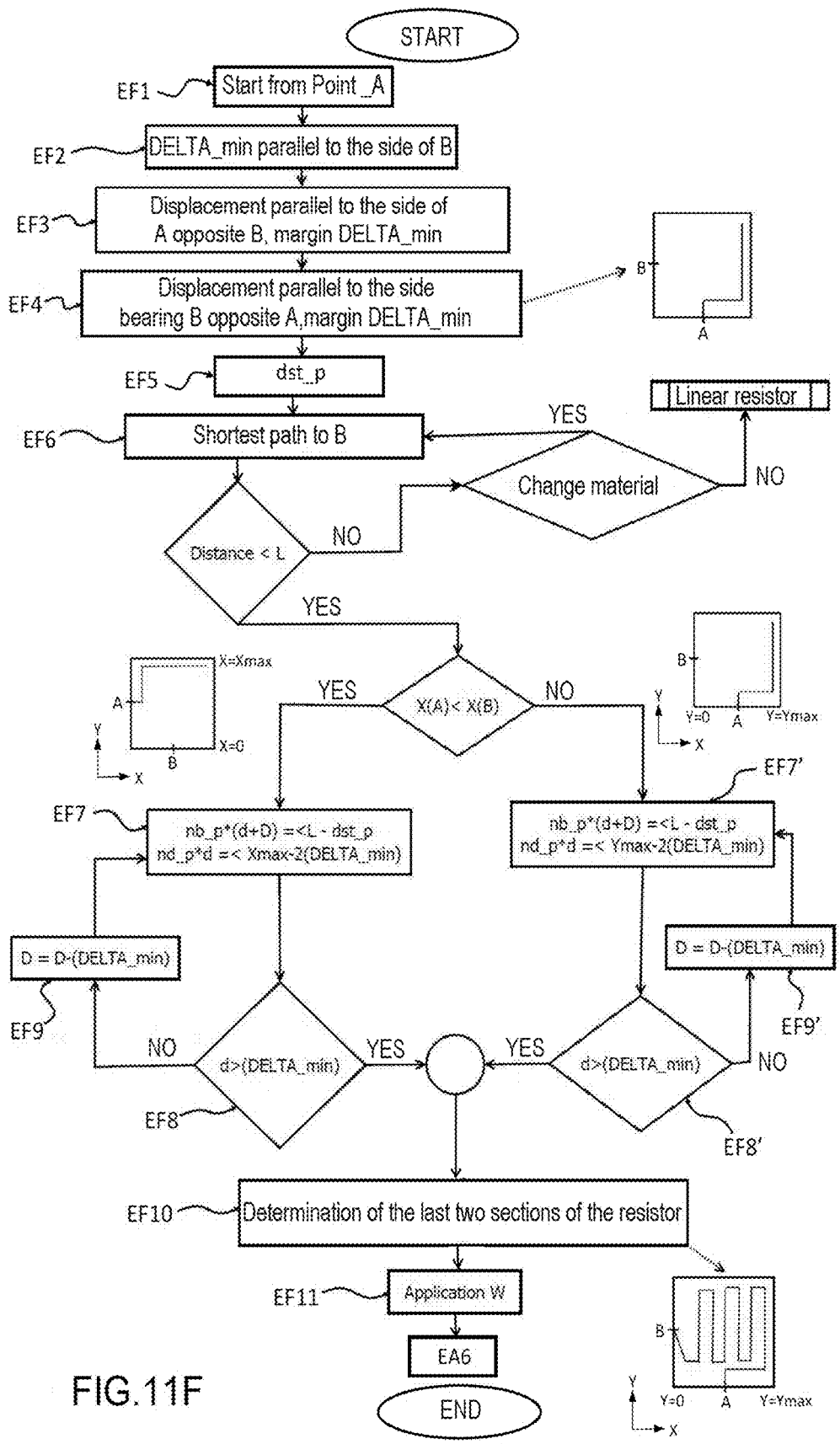

The design algorithm for a zigzag resistor is illustrated in FIGS. 11O to 11F.

As in the case of the linear resistor, the user supplies as input to the computer system the width Wmax (EC1) and the length Ymax (EC2) of the region, assumed rectangular, containing the resistor, and the coordinates of the origin of the reference frame (EC3). He or she also supplies the width W and the thickness H of the resistive "wire" forming the zigzag pattern (EC4, EC5), which allows the system to compute the length of this wire: $L=R\_user \cdot W \cdot H/RHO$ (EC6). Then, the user supplies as input the coordinates of the contact points A and B of the resistor (EC7, EC8), which allows the system to determine whether these points are located on opposite sides of the rectangular region, on the same side or on adjacent (and orthogonal) sides. These three particular cases have three different corresponding algorithms which are illustrated by FIGS. 11D, 11E and 11F, respectively.

When the point B is located facing A (FIG. 11D), the path of the conductive wire is determined by starting from the point A (step ED1), by moving by a predefined pitch of length DELTA_min (small relative to the dimensions of the rectangular region containing the resistor, but greater than the width W of the wire) to the side where B is located and at right angles to the side where A is located (ED2). Then, there is movement parallel to the side of A, in the direction of the vertex of this side furthest away from A, stopping at a distance DELTA_min from the edge of the rectangular region, to keep a safety margin (ED3). Then, there is another displacement by the length DELTA_min to the side where B is located and at right angles to the side where A is located (ED4). The distance travelled from the start is then memorised, and stored in a variable dist_p (ED5). At this point, the minimum distance remaining to be travelled, in a straight line, to reach B (ED6), is computed. If the sum of dist_p and of this minimum distance exceeds L (computed in the step EC6), that means that it is not possible to produce a zigzag resistor of the desired value; there must therefore be a change of material. Otherwise, the system determines whether the points A and B face in the direction x or in the direction y. Hereinbelow only the first case is considered (steps ED7, ED8, ED9); the operations performed in the opposite case are in all respects similar (steps ED7', ED8', ED9').

The zigzag resistor is essentially made up of a certain number nb_p of patterns (meanders) formed by a short line, of a length d, in the direction at right angles to the sides which bear A and B (direction x, in the example considered here) and a long line, of a length D, in the right-angled direction, plus two end segments—of a length dist_p from the side of A and of a length to be computed from the side of B. In the step ED7, efforts are made to resolve the system:

$$nb\_p \cdot (d+D) \leq L\text{-dist}\_p$$

$$nb\_p \cdot d \leq X\text{max}-2 \cdot \text{DELTA\_min}$$

by making an assumption on the value of D (because there are three unknowns and only two inequalities). The initial hypothesis is: $D=Y\text{max}-2 \cdot \text{DELTA\_min}$.

In step ED8, there is a check to see if the solution found bears out the condition d>DELTA_min. If not, the value of D is decremented by DELTA_min (ED9), and the step ED7 is executed again.

The final section is made of the shortest path which links the terminal end of the last pattern to B (ED10). In general, to obtain a total length equal to L, it will be necessary to adjust the length of the last long line (penultimate section of the resistor, which will therefore not necessarily be equal to D. To construct the volume of the resistor from the travel thus determined all that has to be done is to apply the width of the wire W (ED11).

When the point B is located on the same side as A (FIG. 11E), the travel of the conductive wire is determined by starting from the point A (step EE1), by moving by one predefined pitch of length DELTA_min (small relative to the dimensions of the rectangular region containing the resistor but greater than the width W of the wire) in the direction at right angles to the side where the points A and B are located (EE2). Then (EE3), there is a movement parallel to this side and opposite B, until only a safety distance DELTA_min is left from the side at right angles to the starting side. Then, there is further movement by the distance DELTA_min in the direction of the first movement, that is to say at right angles to the side bearing A and B ((EE4). The subsequent steps—EE7, EE8 to EE10, EE8' to EE10', EE11, EE12—are identical to the steps ED6, ED7 to ED9 and ED7' to ED9', ED10 and ED11 described above.

When the point B is located on a side adjacent, and therefore at right angles, to that which bears the point A (FIG. 11F), the travel of the conductive wire is determined by starting from the point A (step EF1), by moving by a predefined pitch of length DELTA_min (small relative to the dimensions of the rectangular region containing the resistor, but greater than the width W of the wire) in the direction at right angles to the side where the point A is located (EF2), then there is movement parallel to this side and towards the side opposite to that bearing the point B, to a safety distance DELTA_min from the latter (EF3). Next, there is movement parallel to this side until a safety distance DELTA_min from the side opposite that of A (EF4) is left. The rest (steps EF5-EF11) is identical to the preceding cases.

Figure 11G:
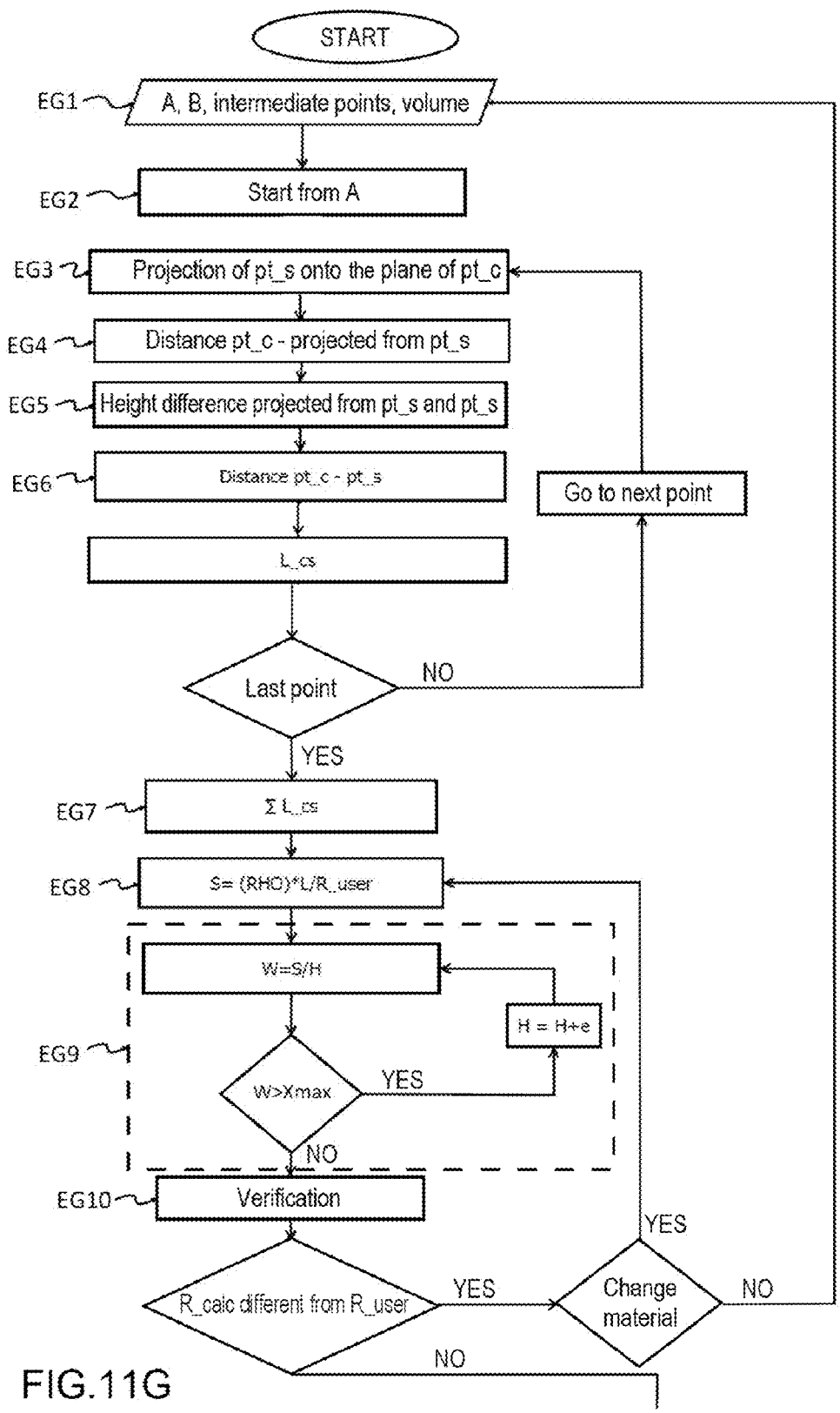
Figure 11H:
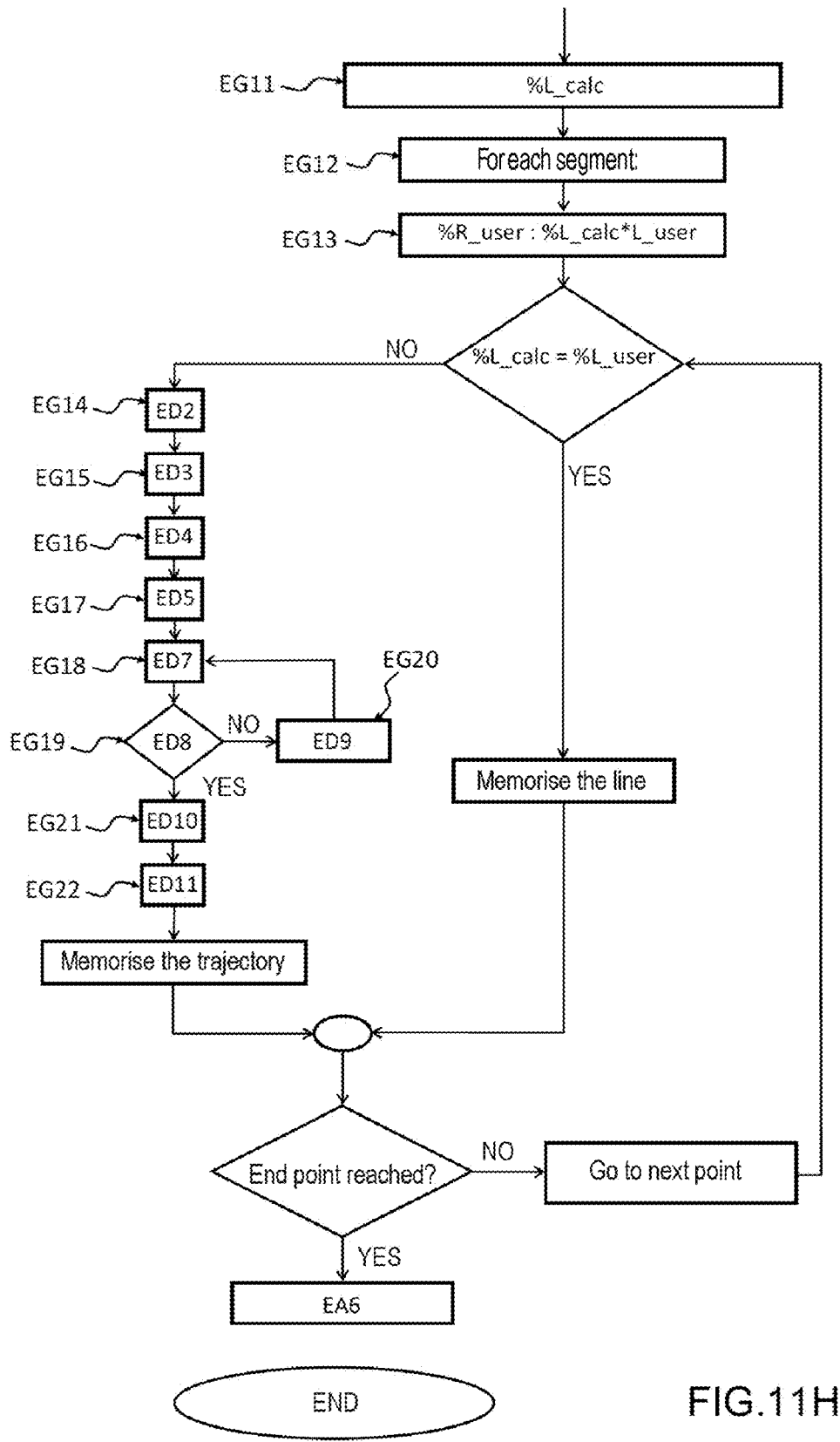

The last particular case, that of a three-dimensional resistor, is the subject of FIGS. 11G and 11H. Firstly, the user must define a volume in which the resistor is defined, the points of departure (A) and of arrival (B), as well as intermediate points of passage (EG1). It is important to note that, in the FDM three-dimensional printing technique, a volume takes the form of a stack of layers of predefined thickness. The position of a point can therefore be defined by identifying the layer to which it belongs and by giving its two-dimensional coordinates within the latter. Defining the travel of the resistor involves starting from the point A (EG2), identifying the projection pt_s of the next point of passage on the layer containing A—or, more generally, the current point pt_c (EG3), and determining the distance to be travelled to reach this projection (EG4), as well as the height difference between the layer of the current point and that of the next point (EG5). The distance L_cs between the points pt_c and pt_s is the sum of the distance in the plane, determined in the step EG3, and of the height difference (EG6); this distance is memorised. Next, there is a transition to the next point, and so on, until the point B is reached. L_calc, the sum of the lengths L_cs, is then computed (EG7). The knowledge of the resistivity RHO of the material then makes it possible to compute the section S of the resistive pattern (EG8); from the knowledge of this section, the thickness and the width are computed as was explained with reference to the linear case of FIG. 11B (step EG9). There is then a check if the resistor thus obtained, R_calc, has the desired value R_user (EG10). If R_calc, <R_user, and if the user does not want to change material, at least some of the straight segments linking two successive points of passage within one and the same layer must be replaced by zigzags. To do this, the length of each intermediate segment is expressed as a percentage of L_calc (EG11), and it is assigned a resistance to be reached which corresponds to the same percentage of R_user (EG12). The process then proceeds as in the case of FIG. 11D—the steps EG13-EG16 correspond to the steps ED2-ED5, the steps EG17, EG18, EG19 to the steps ED7 to ED9 and ED7' to ED9' and the steps ED20, ED21 to the steps ED10 and ED11.

Another example of electrical components that can be manufactured by three-dimensional printing according to the invention, and the manufacturing of which can be facilitated by the use of a programming interface, is a uni-axial deformation (or strain) gauge of piezoresistive type.

The relative variation of resistance $\Delta R$ of a piezoresistive element exhibiting a resistance at rest $R_0$ has the value:

$$\Delta R/R_0 = k \cdot \varepsilon$$

in which k is the piezoresistive sensitivity and e the deformation, with $\varepsilon = \Delta L/L_0$, $\Delta L$ being the variation of length and L the length at rest of the element. When designing a sensor, the initial length (and therefore the resistance) is a function of the filling rate of the volume of the sensor.

Figure 12A:
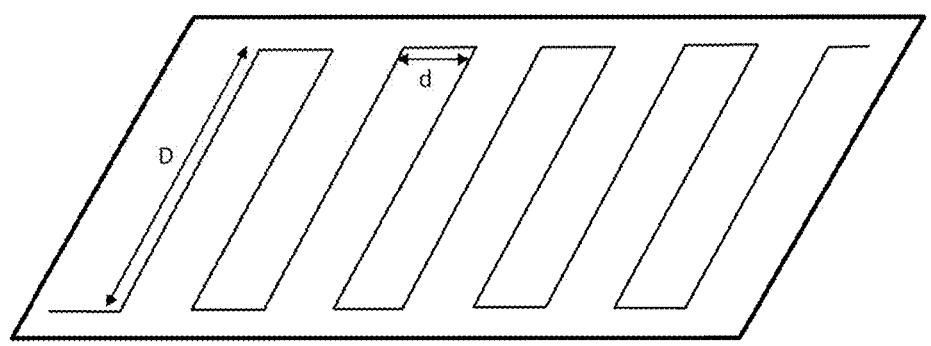
FIGS. 12A-12C, illustrations of the concept of filling of a surface.

Just like any element manufactured by FDM three-dimensional printing, a piezoresistive sensor is formed by filaments, or strips; this structure is illustrated in FIG. 12A. The sensor works by the convergence or the separation of the strips under the effect of a strain. In effect, if the strips are brought closer together, microcontacts are created which make the resistance drop. Conversely, if the strips are moved away from one another, the current intensity circulating is lower. It will be understood that the sensitivity to deformations is much greater for the deformations parallel to the small filling axis, indicated by d in FIG. 12A, than for the deformations parallel to the great axis D.

If the filling rate is equal to 100%, which means that the strips are perfectly contiguous and in mutual contact over their entire length, the resistance variations will not be measurable. The same will apply in the case of an excessively low filling rate. Empirically, it has been found that filling rates of 40 to 70% give results that are perfectly acceptable for most materials considered.

Figures 12B, 12C:
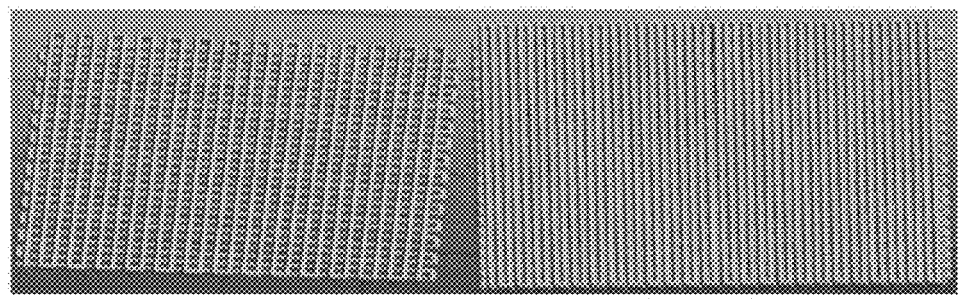

A comparison of FIGS. 12A and 12B makes it possible to observe that a 40% filling (FIG. 12A) implies a shorter filament length than with a 70% filling (FIG. 12B). In a sensor with a filling rate of the order of 70%, the conductivity depends significantly on the percolation of the current, that is to say on the presence of conductive micropaths linking the meanders to one another. These micropaths can easily be interrupted by small deformations of the structure, which means that a sensor having a high filling rate—but not too high, for example of the order of 70%—will be capable of detecting smaller deformations than a sensor with a filling rate of only 40%. However, such a sensor will also be more sensitive to manufacturing defects, for example short circuits provoked by a dirty extrusion head. Note that, in the examples of FIGS. 12A and 12B, several layers of resistive material have been deposited, with right-angled deposition angles, which leads to an isotropic piezoresistive sensitivity.

The flow diagram of FIG. 13 illustrates the design steps for a piezoresistive strain sensor. First of all (step EP1) the user produces the form that he or she wants on CAD software and imports it in STL format (meshing of the volume with triangles). Then, in order to be sure that the sensor will be flexible and strong enough, its height H is set to a predefined value, for example three times the print thickness e (EP2).

The last layer will serve as sensor. The other layers can for example be produced in insulating material with a fixed filling, generally between 60 and 100% and for example equal to 70%, so as to allow the sensor more or less flexibility (EP3). As a variant, conductive or resistive layers having another function can also be present under that serving as strain sensor.

On the layer of the sensor, the user defines the position of the electrodes (EP4) and chooses the resistive material, from a list which is proposed to him or her (EP5), as well as the desired sensitivity—also from a list of possible values (EP6). The filling is done generally in rectangular mode (EP7), with a main direction of filling at right angles to the axis defined by the two electrodes (EP8).

A table, constructed in a preliminary calibration step and stored in a memory of the computer executing the method, makes it possible to find the filling rate that makes it possible to achieve the desired sensitivity, given the material chosen and the desired geometry (EP9).

The printing speed (EP10) can be determined as a function of the filling rate also determined, typically by means of another look-up table constructed by calibration. For example, it is possible to choose a low printing speed for high filling rates in order to avoid the short-circuits which can occur when residues of filament remain glued to the nozzle and come unstuck from time to time during the printing. For lower filling rates, the separation of the lines of passage, and therefore the absence of material in the passage of the nozzle, is generally sufficient to avoid having a residue come to stick; it is therefore possible to print at a higher speed, for example of 60 mm/s. In a variant, a relatively low printing speed can be used (for example 30 mm/s) independently of the filling rate.

The invention has been described with reference to mechatronic systems comprising piezoresistive sensors. However, the invention is not limited to this particular case. It is in fact possible, particularly by appropriately choosing the fillers contained in the thermoplastic matrix, to print, by FLM, materials sensitive to temperature, to light, to chemical agents, etc., so as to obtain thermal, optical, chemical sensors, respectively. Moreover, from conductive and insulating materials, it is possible to manufacture capacitive or inductive sensors, and antennas that can be used in transmission and/or in reception. It is also possible to produce thermal, electrostatic, magnetic (using ferromagnetic fillers) or even piezoelectric actuators. It is also possible to print OLEDs (Organic Light-Emitting Diodes) and/or organic photovoltaic cells.

In some cases, the invention will allow the production of an entirely printed mechatronic system. In other cases, only a part of the electrical/electronic subassembly of such a system will be printed (sensors, conductive lines, actuators, etc.) while other components—for example integrated circuits performing complex electronic functions, will be able to be added. Even in the latter case, the invention makes it possible to reduce the number of assembly operations, and therefore to make the manufacturing of the mechatronic system faster and less expensive.

REFERENCES

[Coiai, 2015] Serena Coiai et. Al, "Nanocomposites Based on Thermoplastic Polymers and Functional Nanofiller for Sensor Applications", Materials, vol. 8, pages 3377-3427, 2015.

[Deng, 2014] Hua Deng et al., "Progress on the morphological control of conductive network in conductive polymer composites and the use as electroactive multifunctional materials", Progress in Polymer Science, Vol. 39, pages 627-655, 2014.

[Muth, 2014] Joseph T. Muth et al., "Embedded 3D Printing of Strain Sensors within Highly Stretchable Elastomers", Advanced Materials, Vol. 26, pages 6307-6312, 2014.

[Sitthi-Amorn, 2015] Pitchaya Sitthi-Amorn et al. "MultiFab: A Machine Vision Assisted Platform for Multimaterial 3D Printing" ACM Transactions on Graphics (SIGGRAPH 2015).

[Rossiter, 2009] Jonathan Rossiter et al. "Printing 3D dielectric elastomer actuators for soft robotics" Proc. of SPIE Vol. 7287, 72870H (2009).

[Leigh, 2012] Simon J. Leigh et al. "A Simple, Low-Cost Conductive Composite Material for 3D Printing of Electronic Sensors", PLOS ONE, Vol. 7, Issuer 11, e49365 (November 2012).

[O'Brien, 2015] Jonathan O'Brien et al. "Miniaturization of Microwave Components and Antennas Using 3D Manufacturing" 9th European Conference on Antennas and Propagation (EuCAP), Lisbonne, 13-17 May 2015.

The invention claimed is:

1. A method for manufacturing a mechatronic system comprising:
    a step of manufacturing a mechanical structure by three-dimensional printing by fused filament deposition of at least one first electrically insulating material; and
    a step of manufacturing at least one electrical component in contact with at least one element of said mechanical structure and secured therewith;
    in which said step of manufacturing at least one electrical component is implemented by three-dimensional printing by fused filament deposition of at least one second material, conductive or resistive, directly in contact with said element of the mechanical structure;
    wherein said or one said electrical component is a transducer,
    a three-dimensional printer of the fused filament deposition type having at least two distinct extrusion heads, that can be activated independently and adapted to deposit two different materials,
    said extrusion heads being arranged side-by-side with the same direction of extrusion and being borne by a same print carriage ensuring their simultaneous displacement,
    said extrusion head also comprising a mechanism for displacing an inactive extrusion head in a direction away from said direction of extrusion when said or one other said extrusion head is active,
    said print carriage is equipped with a capacitive sensor configured to measure its distance from a print surface,
    the three-dimensional printer further comprising a print platen over which said print carriage is displaced,
    said print platen being equipped with metal electrodes that can be detected by said capacitive sensor, whereby said capacitive sensor allows a calibration of the position of the print carriage relative to the platen.

2. The method according to claim 1, in which said transducer is a piezoresistive sensor.

3. The method according to claim 1, in which said second material, conductive or resistive, comprises conductive fillers dispersed in a thermoplastic insulating matrix.

4. The method according to claim 1, also comprising a local annealing step implemented during or after the deposition of a layer of the first material or of the second material, matching said deposition.

5. The method according to claim 1, also comprising a step of deposition of an adhesion-promoting agent on a surface of the mechatronic system during manufacture before the deposition, on said surface, of a layer of a different material.

6. The method according to claim 1, comprising the use of at least two distinctive extrusion heads for the deposition of the first material and of the second material.

7. The method according to claim 1, also comprising a step of generation of a print file for the production of at least one said electrical component, said step being implemented by computer and comprising:
    a substep consisting in providing said computer with the data indicative of a position of one or more contact points, of a spatial region where said component must be manufactured and of at least one electrical property of said component;
    a substep of computation of a geometry of said component by application to said data of a predefined mathematical model; and
    a substep of generation of said print file making it possible to produce said geometry by three-dimensional printing by fused filament deposition of said or of at least one said second material, conductive or resistive.

8. The method according to claim 1, wherein said extrusion head further comprises an actuator configured to displace an inactive extrusion head in a direction away from said direction of extrusion when said or one other said extrusion head is active.

9. A mechatronic system comprising an electrically insulating mechanical structure and at least one electrical component arranged in contact with at least one element of said mechanical structure and secured therewith, in which the mechanical structure and the electrical component are produced in a single block by three-dimensional printing of at least one first electrically insulating material forming said mechanical structure and of at least one second conductive or resistive material forming said electrical component; wherein said or one said electrical component is a transducer,
- a three-dimensional printer of the fused filament deposition type having at least two distinct extrusion heads, that can be activated independently and adapted to deposit two different materials,
- said extrusion heads being arranged side-by-side with the same direction of extrusion and being borne by a same print carriage ensuring their simultaneous displacement,
- said extrusion head also comprising a mechanism for displacing an inactive extrusion head in a direction away from said direction of extrusion when said or one other said extrusion head is active,
- said print carriage is equipped with a capacitive sensor configured to measure its distance from a print surface,
- the three-dimensional printer further comprising a print platen over which said print carriage is displaced,
- said print platen being equipped with metal electrodes that can be detected by said capacitive sensor, whereby said capacitive sensor allows a calibration of the position of the print carriage relative to the platen.

10. The mechatronic system according to claim 9, wherein said extrusion head further comprises an actuator configured to displace an inactive extrusion head in a direction away from said direction of extrusion when said or one other said extrusion head is active.

11. An apparatus for manufacturing a mechatronic system, comprising a three-dimensional printer of the fused filament deposition type having at least two distinct extrusion heads, that can be activated independently and adapted to deposit two different materials, said extrusion heads being arranged side-by-side with the same direction of extrusion and being borne by a same print carriage ensuring their simultaneous displacement, the extrusion head also comprising a mechanism for displacing an inactive extrusion head in a direction away from said direction of extrusion when said or one other said extrusion head is active, said print carriage being equipped with a capacitive sensor configured to measure its distance from a print surface, the apparatus also comprising a print platen over which said print carriage is displaced, said print platen being equipped with metal electrodes that can be detected by said capacitive sensor, whereby said capacitive sensor allows a calibration of the position of the print carriage relative to the platen.

12. The apparatus according to claim 11, equipped with: a camera configured to acquire an image of a layer of material deposited by the three-dimensional printer; an image processing system configured to compare said image with a three-dimensional model stored in a computer memory and deduced therefrom an error of position of said print carriage; and a computer driving system for said carriage configured to correct said position error upon the deposition of a successive layer of material.

13. The apparatus according to claim 11, also comprising a computer system for generating a print file to drive said three-dimensional printer so as to manufacture an electrical component, said computer system being configured to:
- receive as input data indicative of a position of one or more contact points, of a spatial region where said component must be manufactured and of at least one electrical property of said component;
- compute a geometry of said component by application to said data of a predefined mathematical model; and
- generate a print file making it possible to produce said geometry by three-dimensional printing by fused filament deposition of at least one conductive or resistive material.

14. The apparatus according to claim 11, also comprising a generator of a beam of electromagnetic radiation, said generator being configured to produce a local heating of a material deposited on a print surface of said three-dimensional printer.

15. The apparatus according to claim 11, wherein said extrusion head further comprises an actuator configured to displace an inactive extrusion head in a direction away from said direction of extrusion when said or one other said extrusion head is active.

* * * * *

UNITED STATES PATENT AND TRADEMARK OFFICE
CERTIFICATE OF CORRECTION

PATENT NO. : 10,807,301 B2
APPLICATION NO. : 16/307132
DATED : October 20, 2020
INVENTOR(S) : Mehdi Ammi et al.

Page 1 of 1

It is certified that error appears in the above-identified patent and that said Letters Patent is hereby corrected as shown below:

On the Title Page

In the Abstract, Item (57):
"Method for manufacturing a mechatronic system comprising: a step of manufacturing a mechanical structure (SM) by three-dimensional printing by fused filament deposition of at least one first electrically insulating material (M1); and a step of manufacturing at least one electrical component (CE) in contact with at least one element of said mechanical structure and secured therewith; characterized in that said step of manufacturing at least one electrical component is implemented by three-dimensional printing by fused filament deposition of at least one second material (M2), conductive or resistive, directly in contact with said element of the mechanical structure. Apparatus for implementing such a method. Mechatronic system that can be manufactured by such a method.", Should be:
-- A method for manufacturing a mechatronic system includes a step of manufacturing a mechanical structure by three-dimensional printing by fused filament deposition of at least one first electrically insulating material; and a step of manufacturing at least one electrical component in contact with at least one element of the mechanical structure and secured therewith; wherein the step of manufacturing at least one electrical component is implemented by three-dimensional printing by fused filament deposition of at least one second material, conductive or resistive, directly in contact with the element of the mechanical structure. An apparatus for implementing such a method and a mechatronic system that can be manufactured by such a method are provided. --

Signed and Sealed this
Ninth Day of November, 2021

Drew Hirshfeld
*Performing the Functions and Duties of the
Under Secretary of Commerce for Intellectual Property and
Director of the United States Patent and Trademark Office*